United States Patent
Yang

(10) Patent No.: US 11,533,167 B2
(45) Date of Patent: Dec. 20, 2022

(54) METHODS AND DEVICES FOR OPTIMAL INFORMATION-THEORETICALLY SECURE ENCRYPTION KEY MANAGEMENT

(71) Applicant: BicDroid Inc., Petersburg (CA)

(72) Inventor: En-Hui Yang, Petersburg (CA)

(73) Assignee: BICDROID INC., Petersburg (CA)

( * ) Notice: Subject to any disclaimer, the term of this patent is extended or adjusted under 35 U.S.C. 154(b) by 393 days.

(21) Appl. No.: 16/880,010

(22) Filed: May 21, 2020

(65) Prior Publication Data
US 2020/0382290 A1 Dec. 3, 2020

Related U.S. Application Data

(60) Provisional application No. 62/853,081, filed on May 27, 2019.

(51) Int. Cl.
*H04L 9/08* (2006.01)
*H04L 9/40* (2022.01)

(52) U.S. Cl.
CPC .......... *H04L 9/0822* (2013.01); *H04L 9/0869* (2013.01); *H04L 9/0894* (2013.01); *H04L 63/062* (2013.01)

(58) Field of Classification Search
CPC ....... H04L 9/08; H04L 9/0822; H04L 9/0869; H04L 9/0894; H04L 63/06; H04L 63/062;
(Continued)

(56) References Cited

U.S. PATENT DOCUMENTS 5,963,646 A * 10/1999 Fielder ............... H04L 9/0869
380/259
7,212,634 B2 * 5/2007 Briscoe ............... H04L 9/0836
713/180
(Continued)

FOREIGN PATENT DOCUMENTS

WO 2005046114 A2 5/2005
WO 2015003984 A1 1/2015
WO 2016033610 A1 3/2016

OTHER PUBLICATIONS

International Search Report and Written Opinion dated Aug. 26, 2020 in respect of PCT/CA2020/050679.
(Continued)

*Primary Examiner* — Shaqueal D Wade-Wright
(74) *Attorney, Agent, or Firm* — Bereskin & Parr LLP/S.E.N.C.R.L., s.r.l.

(57) ABSTRACT

Method, device and computer program product for managing a plurality of encryption keys using a keystore seed that defines a seed bit set. A key management process defines a key mapping between the seed bit set and the plurality of encryption keys. The key management process enables each encryption key to be generated from the seed bit set using a corresponding keying material value and the key mapping. The key mapping specifies that an encryption key is generated by partitioning the seed bit set into a plurality of seed bit partitions, determining a keying value from the keying material value, determining a key sequence using the plurality of seed bit partitions and the keying value, and determining the encryption key from the key sequence. Management of a large number of encryption keys can be simplified through indirect management via the keystore seed and the key management process.

27 Claims, 2 Drawing Sheets

(58) Field of Classification Search
CPC . H04L 63/04; H04L 63/0435; H04L 63/0428; G06F 21/60; G06F 21/602; G06F 21/604

See application file for complete search history.

(56) References Cited

U.S. PATENT DOCUMENTS

| | | | |
|---|---|---|---|
| 9,619,667 B2 | 4/2017 | Yang et al. | |
| 9,703,979 B1* | 7/2017 | Yang | H04L 9/3231 |
| 2009/0204824 A1* | 8/2009 | Lin | G06F 12/0246 |
| | | | 714/E11.041 |
| 2020/0042746 A1* | 2/2020 | Avanzi | H04L 9/0618 |

OTHER PUBLICATIONS

A.J. Menezes et al., "Handbook of Applied Cryptography", CRC Press, 1996.

C. Shannon, "Communication theory of secrecy systems", Bell System Technical Journal, 28(4): 656-715, 1949.

J. Maurer, "Conditionally-perfect secrecy and a provably-secure randomised cipher", Journal of Cryptology, 5(1):53-66, 1992.

J. Maurer, "Secret key agreement by public discussion from common information", IEE Trans. Inform. Theory. 39(3), 733-742, 1993.

R. Ahiswede et al., "Common randomness in information theory and cryptography—Part I: secret sharing", IEEE Trans. Inform. Theory, 39(4): 1121-1132, 1993.

A.D. Wyner, "The wire-tap channel", Bell Syst. Tech. J., 54(8): 1355-1387, 1975.

C. Fragouli et al., "Wireless network security: building on erasures", Proceedings of the IEEE, 103(10): 1826-1840, 2015.

E.-H. Yang et al., "Information-Theoretically Secure Key Generation and Management", Proc. of the 2017 IEEE International Symposium on Information Theory (ISIT 2017), Aachen, Germany, Jun. 25-30, 2017, pp. 1529-1533.

Advanced Encryption Standard (AES). Federal Information Processing Standards (FIPS) Publication 197, United States National Institute of Standards and Technology (NIST), 2001.

Cloud Security Alliance. The notorious nine: Cloud computing top threats in 2013. http://www.cloudsecurityalliance.org/topthreats.

\* cited by examiner

METHODS AND DEVICES FOR OPTIMAL INFORMATION-THEORETICALLY SECURE ENCRYPTION KEY MANAGEMENT

CROSS-REFERENCE TO RELATED APPLICATION

This application claims the benefit of the U.S. Provisional Application No. 62/853,081, filed on May 27, 2019, the entirety of which is incorporated herein by reference.

FIELD

Embodiments of the present invention relate generally to data protection and encryption, and more specifically to methods and computer program products for generating and managing encryption keys.

INTRODUCTION

The following is not an admission that anything discussed below is part of the prior art or part of the common general knowledge of a person skilled in the art.

As people become more reliant on computing and Internet technologies, data security is becoming more important than ever. With Internet connections becoming ubiquitous, it is relatively easy to access and distribute data widely. To enjoy the benefits of cloud computing, people and companies upload data to cloud servers. This often includes private or confidential data, or any data a user might want to protect. This increases the chance for private and important data to become unnecessarily exposed if it is left unprotected.

Cloud storage may have a number of associated security vulnerabilities. For example, security threats to cloud computing can include data breaches, data loss, malicious insiders, and shared technology issues. One way to mitigate data security issues is by way of encryption. For example, files may be encrypted before being saved and stored, uploaded, and/or transmitted. Without the corresponding decryption key, the encrypted file may not be meaningful.

Key management (management of the encryption and decryption keys) plays a fundamental role in cryptosystems. Proper key management can form the basis for securing cryptographic techniques providing confidentiality, entity authentication, data origin authentication, data integrity, and digital signatures (see e.g. A. J. Menezes, P. C. van Oorschot, and S. A. Vanstone, *Handbook of Applied Cryptography*. CRC Press, 1996). A secure key management process is expected to provide techniques and procedures supporting the establishment and maintenance of keying materials and secret keys between/among authorized parties.

Data on a public cloud is required to be stored for a long period of time. The stored data may also be accessed frequently by a large number of legitimate users. To protect confidentiality, data can be encrypted before being uploaded to the cloud. For example, a secure symmetric cypher such as the Advanced Encryption Standard (AES) (see e.g. Advanced Encryption Standard (AES). Federal Information Processing Standards (FIPS) Publication 197, United States National Institute of Standards and Technology (NIST), 2001) may be used for data encryption and decryption. Due to the nature of long term storage and frequent access, it may be preferable for every file to be encrypted with its own random key. This may provide enhanced security against various attacks such as ciphertext-only attacks and known/chosen-plaintext attacks (see e.g. A. J. Menezes, P. C. van Oorschot, and S. A. Vanstone, *Handbook of Applied Cryptography*. CRC Press, 1996).

However, as the number of encrypted files increases, the list of random keys grows accordingly. Since encrypted files stored in the cloud are often required to be accessible to legitimate users any time in the future, the keys and keying materials are required to be securely maintained to ensure data security and accessibility. In particular, no keys and keying material can be deleted. Likewise, these encrypted files often need to be accessible through different devices by different legitimate users. Nonetheless, the list of random keys may grow to contain millions or billions of keys. As a result it becomes increasingly difficult to securely generate, distribute, and maintain this list of random keys. This problem may be loosely referred to as the key management problem. Compared with the traditional application of encryption for securing communications, cloud data security makes the key management problem more challenging.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

The present disclosure provides methods, devices and computer program products that may be used to manage a plurality of encryption keys. A large number of random encryption/decryption keys may be securely generated, distributed, and maintained while managing a relatively smaller number of shared secret bits referred to as a keystore seed. A key management process can be defined to provide a key mapping between the keystore seed and the plurality of encryption keys. The keystore seed can define a seed bit set that are the secret bits that may be shared between devices. The key mapping can be defined to allow each encryption key to be easily determined from the seed bit set and a keying value for that encryption key. The key management process can be defined to provide a specified level of data security. Through the use of a key management process as described herein, the large number of encryption keys can be managed by managing a single keystore seed, simplifying the key management process while retaining a high level of data security.

In accordance with this broad aspect, there is provided a method for managing a plurality of encryption keys using at least one computing device, each computing device having a processor and a non-transitory memory, the method comprising storing a keystore seed in the non-transitory memory of a particular computing device of the at least one computing device, the keystore seed usable to generate each encryption key in the plurality of encryption keys, wherein the keystore seed defines a seed bit set having a plurality of seed bits and the plurality of seed bits in the seed bit set are independent and identically distributed, and wherein each encryption key is defined by a plurality of key bits, the encryption key has a specified key length, the specified key length is the same for each encryption key, and the specified key length defines a number of key bits in the plurality of key bits, wherein the seed bit set has a seed bit set length, the seed bit set length specifies the number of seed bits in in the seed bit set, and the seed bit set length is at least twice the specified key length; determining, by the processor of the particular computing device, a key management process that defines a key mapping between the seed bit set and the plurality of encryption keys, wherein the key management process is usable by the processor of the particular computing device to generate each encryption key in the plurality of encryption keys from the seed bit set using the key mapping and a keying material value corresponding to that encryption key; and storing key management instructions corresponding to the key management process in the device memory of the particular computing device, wherein the key management instructions are executable by the processor of the particular computing device to generate any specific encryption key in the plurality of encryption keys by: partitioning the seed bit set into a plurality of seed bit partitions, wherein the number of seed bit partitions in the plurality of seed bit partitions is defined by a partition value determined based on a ratio of the number of seed bits in the seed bit set to the number of key bits, wherein the partition value is an integer value at least equal to the ratio of the number of seed bits in the seed bit set to the number of key bits; determining a keying value from the keying material value corresponding to the specific encryption key; determining a key sequence using the plurality of seed bit partitions and the keying value, wherein the key sequence includes a plurality of key sequence bit sets, and each key sequence bit set corresponds to one of the seed bit partitions; and determining an encryption key from the key sequence, wherein the encryption key is usable by the at least one processor to perform at least one of encrypting a plaintext file and decrypting a ciphertext file.

In some examples, the key sequence may be determined by multiplying each seed bit partition by a corresponding exponential of the keying value, and each key sequence bit set may correspond to the multiplication of one of the seed bit partitions with a different exponential of the keying value.

In some examples, the encryption key may be determined based on a bit-wise addition of the plurality of key sequence bit sets in the key sequence.

In some examples, each seed bit partition may have a partition length equal to the specified key length such that the number of seed bits in each seed bit partition is equal to the number of key bits.

In some examples, the key management process may specify that the keying value is defined as the keying material value.

In some examples, the key management process may specify that determining the encryption key from the key sequence includes: determining a key sequence output from the key sequence, where the key sequence output is determined by a bit-wise addition of the plurality of key sequence bit sets in the key sequence; and determining the encryption key by: inputting the key sequence output to a symmetric encryption cipher, where the symmetric encryption cipher is configured to generate a ciphertext key sequence using the key sequence output; and determining the encryption key as the ciphertext key sequence.

In some examples, the key management process may specify that the keying value is determined by: inputting the keying material value to a symmetric encryption cipher, where the symmetric encryption cipher is configured to generate a ciphertext keying material value using the keying material value; and determining the keying value as the ciphertext keying material value.

In some examples, the method may include identifying a file to be encrypted; generating a file encryption key by randomly selecting a particular keying material value; determining a particular keying value from the particular keying material value using the key management process; determining a particular key sequence from the plurality of seed bit partitions and the particular keying value using the key management process; and determining the file encryption key from the particular key sequence using the key management process; and generating an encrypted file by: applying an encryption cipher to the file to generate a ciphertext file, where the encryption cipher uses a cipher key to generate the ciphertext file, and the file encryption key is used as the cipher key for the encryption cipher when the encryption cipher is applied to the file; and generating the encrypted file from the ciphertext file.

In some examples, the encrypted file may include the ciphertext file and file keying material corresponding to the particular keying material value.

In some examples, the method may include identifying a given encrypted file to be decrypted; determining a given keying material value corresponding to the given encrypted file; determining a given keying value from the given keying material value using the key management process; determining a given key sequence using the plurality of seed bit partitions and the given keying value using the key management process; and generating a file decryption key from the given key sequence using the key management process; and generating a decrypted file by applying a decryption cipher to the given encrypted file to generate a plaintext file, where the decryption cipher uses a decryption cipher key to generate the plaintext file, and the file decryption key is used as the decryption cipher key for the decryption cipher when the decryption cipher is applied to the given encrypted file.

In some examples, determining the given keying material value corresponding to the given encrypted file may include extracting the given keying material value from the encrypted file.

In some examples, the seed bit set length may be at least three times the specified key length, and the seed bit set length may be an integer multiple of the specified key length.

In some examples, the keystore seed defines an initial set of initial seed bits, where the initial set of initial seed bits has an initial set length less than the seed bit set length, and the seed bit set is defined by appending zeros to the initial set of initial seed bits such that a combined length of the initial set of initial seed bits and the appended zeros equals the seed bit set length.

In some examples, the method may include securely transmitting the key management instructions and the keystore seed to a plurality of different computing devices, where the key management instructions and the keystore seed enable each different computing device to generate each encryption key in the plurality of encryption keys.

In accordance with this broad aspect there is also provided a computer program product for managing a plurality of encryption keys, the computer program product comprising a computer readable medium having computer executable instructions stored thereon, the instructions for configuring a processor of a computing device to: store a keystore seed in a non-transitory memory of the computing device, the keystore seed usable to generate each encryption key in the plurality of encryption keys, wherein the keystore seed defines a seed bit set having a plurality of seed bits and the plurality of seed bits in the seed bit set are independent and identically distributed, and wherein each encryption key is defined by a plurality of key bits, the encryption key has a specified key length, the specified key length is the same for each encryption key, and the specified key length defines a number of key bits in the plurality of key bits, wherein the seed bit set has a seed bit set length, the seed bit set length specifies the number of seed bits in in the seed bit set, and the seed bit set length is at least twice the specified key length; determine a key management process that defines a key mapping between the seed bit set and the plurality of encryption keys, wherein the key management process is usable by the processor to generate each encryption key in the plurality of encryption keys from the seed bit set using the key mapping and a keying material value corresponding to that encryption key; and store key management instructions corresponding to the key management process in the non-transitory memory, wherein the key management instructions are executable by the processor to generate any specific encryption key in the plurality of encryption keys by: partitioning the seed bit set into a plurality of seed bit partitions, wherein the number of seed bit partitions in the plurality of seed bit partitions is defined by a partition value determined based on a ratio of the number of seed bits in the seed bit set to the number of key bits, wherein the partition value is an integer that is at least equal to the ratio of the number of seed bits in the seed bit set to the number of key bits; determining a keying value from the keying material value corresponding to the specific encryption key; determining a key sequence using the plurality of seed bit partitions and the keying value, wherein the key sequence includes a plurality of key sequence bit sets, and each key sequence bit set corresponds to one of the seed bit partitions; and determining an encryption key from the key sequence, wherein the encryption key is usable by the processor to perform at least one of encrypting a plaintext file and decrypting a ciphertext file.

In some examples, the key management instructions may be defined to configure the processor to determine the key sequence by multiplying each seed bit partition by a corresponding exponential of the keying value, where each key sequence bit set corresponds to the multiplication of one of the seed bit partitions with a different exponential of the keying value.

In some examples, the key management instructions may be defined to configure the processor to determine the encryption key based on a bit-wise addition of the plurality of key sequence bit sets in the key sequence.

In some examples, the key management instructions may be defined to configure the processor to define each seed bit partition with a partition length equal to the specified key length such that the number of seed bits in each seed bit partition is equal to the number of key bits.

In some examples, the key management process may specify that the keying value is defined as the keying material value.

In some examples, the key management instructions may be defined to configure the processor to determine the encryption key from the key sequence by: determining a key sequence output from the key sequence, where the key sequence output is determined by a bit-wise addition of the plurality of key sequence bit sets in the key sequence; and determining the encryption key by: inputting the key sequence output to a symmetric encryption cipher, where the symmetric encryption cipher is configured to generate a ciphertext key sequence using the key sequence output; and determining the encryption key as the ciphertext key sequence.

In some examples, the key management instructions may be defined to configure the processor to determine the keying value by: inputting the keying material value to a symmetric encryption cipher, where the symmetric encryption cipher is configured to generate a ciphertext keying material value using the keying material value; and determining the keying value as the ciphertext keying material value.

In some examples, the computer program product may further include instructions for configuring the processor to identify a file to be encrypted; the key management instructions may be defined to configure the processor to generate a file encryption key by randomly selecting a particular keying material value; determining a particular keying value from the particular keying material value using the key management process; determining a particular key sequence from the plurality of seed bit partitions and the particular keying value using the key management process; and determining the file encryption key from the particular key sequence using the key management process; and generating an encrypted file by: applying an encryption cipher to the file to generate a ciphertext file, where the encryption cipher uses a cipher key to generate the ciphertext file, and the file encryption key is used as the cipher key for the encryption cipher when the encryption cipher is applied to the file; and generating the encrypted file from the ciphertext file.

In some examples, the encrypted file may include the ciphertext file and file keying material corresponding to the particular keying material value.

In some examples, the computer program product may further include instructions for configuring the processor to identify a given encrypted file to be decrypted; the key management instructions may be defined to configure the processor to determine a given keying material value corresponding to the given encrypted file; determine a given keying value from the given keying material value using the key management process; determine a given key sequence using the plurality of seed bit partitions and the given keying value using the key management process; and generate a file decryption key from the given key sequence using the key management process; and generate a decrypted file by applying a decryption cipher to the given encrypted file to generate a plaintext file, where the decryption cipher uses a decryption cipher key to generate the plaintext file, and the file decryption key is used as the decryption cipher key for the decryption cipher when the decryption cipher is applied to the given encrypted file.

In some examples of a computer program product, determining the given keying material value corresponding to the given encrypted file may include extracting the given keying material value from the encrypted file.

In some examples of a computer program product, the seed bit set length may be at least three times the specified key length, and the seed bit set length may be an integer multiple of the specified key length.

In some examples of a computer program product, the keystore seed may define an initial set of initial seed bits, where the initial set of initial seed bits has an initial set length less than the seed bit set length, and the seed bit set may be defined by appending zeros to the initial set of initial seed bits such that a combined length of the initial set of initial seed bits and the appended zeros equals the seed bit set length.

In some examples, the computer program product may further include instructions for configuring the processor to securely transmit the key management instructions and the keystore seed to a plurality of different computing devices, where the key management instructions and the keystore seed enable each different computing device to generate each encryption key in the plurality of encryption keys.

In accordance with this broad aspect there is also provided a device for managing a plurality of encryption keys, the device comprising: a processor; and a non-volatile device memory having stored thereon instructions for configuring the processor to: store a keystore seed in the non-volatile device memory, the keystore seed usable to generate each encryption key in the plurality of encryption keys, wherein the keystore seed defines a seed bit set having a plurality of seed bits and the plurality of seed bits in the seed bit set are independent and identically distributed, and wherein each encryption key is defined by a plurality of key bits, the encryption key has a specified key length, the specified key length is the same for each encryption key, and the specified key length defines a number of key bits in the plurality of key bits, wherein the seed bit set has a seed bit set length, the seed bit set length specifies the number of seed bits in in the seed bit set, and the seed bit set length is at least twice the specified key length; determine a key management process that defines a key mapping between the seed bit set and the plurality of encryption keys, wherein the key management process is usable by the processor to generate each encryption key in the plurality of encryption keys from the seed bit set using the key mapping and a keying material value corresponding to that encryption key; and store key management instructions corresponding to the key management process in the non-volatile device memory, wherein the key management instructions are executable by the processor to generate any specific encryption key in the plurality of encryption keys by: partitioning the seed bit set into a plurality of seed bit partitions, wherein the number of seed bit partitions in the plurality of seed bit partitions is defined by a partition value determined based on a ratio of the number of seed bits in the seed bit set to the number of key bits, wherein the partition value is an integer that is at least equal to the ratio of the number of seed bits in the seed bit set to the number of key bits; determining a keying value from the keying material value corresponding to the specific encryption key; determining a key sequence using the plurality of seed bit partitions and the keying value, wherein the key sequence includes a plurality of key sequence bit sets, and each key sequence bit set corresponds to one of the seed bit partitions; and determining an encryption key from the key sequence, wherein the encryption key is usable by the processor to perform at least one of encrypting a plaintext file and decrypting a ciphertext file.

In some examples, the key management instructions stored in the non-volatile device memory may be defined to configure the processor to determine the key sequence by multiplying each seed bit partition by a corresponding exponential of the keying value, where each key sequence bit set corresponds to the multiplication of one of the seed bit partitions with a different exponential of the keying value.

In some examples, the key management instructions stored in the non-volatile device memory may be defined to configure the processor to determine the encryption key based on a bit-wise addition of the plurality of key sequence bit sets in the key sequence.

In some examples, the key management instructions stored in the non-volatile device memory may be defined to configure the processor to define each seed bit partition with a partition length equal to the specified key length such that the number of seed bits in each seed bit partition is equal to the number of key bits.

In some examples, the key management process may specify that the keying value is defined as the keying material value.

In some examples, the key management instructions stored in the non-volatile device memory may be defined to configure the processor to determine the encryption key from the key sequence by: determining a key sequence output from the key sequence, where the key sequence output is determined by a bit-wise addition of the plurality of key sequence bit sets in the key sequence; and determining the encryption key by: inputting the key sequence output to a symmetric encryption cipher, where the symmetric encryption cipher is configured to generate a ciphertext key sequence using the key sequence output; and determining the encryption key as the ciphertext key sequence.

In some examples, the key management instructions stored in the non-volatile device memory may be defined to configure the processor to determine the keying value by: inputting the keying material value to a symmetric encryption cipher, where the symmetric encryption cipher is configured to generate a ciphertext keying material value using the keying material value; and determining the keying value as the ciphertext keying material value.

In some examples, the instructions stored in the non-volatile device memory may be defined to configure the processor to identify a file to be encrypted; and the key management instructions stored in the non-volatile device memory may be defined to configure the processor to generate a file encryption key by randomly selecting a particular keying material value; determining a particular keying value from the particular keying material value using the key management process; determining a particular key sequence from the plurality of seed bit partitions and the particular keying value using the key management process; and determining the file encryption key from the particular key sequence using the key management process; and generating an encrypted file by: applying an encryption cipher to the file to generate a ciphertext file, where the encryption cipher uses a cipher key to generate the ciphertext file, and the file encryption key is used as the cipher key for the encryption cipher when the encryption cipher is applied to the file; and generating the encrypted file from the ciphertext file.

In some examples, the encrypted file may include the ciphertext file and file keying material corresponding to the particular keying material value.

In some examples, the instructions stored in the non-volatile device memory may be defined to configure the processor to identify a given encrypted file to be decrypted; and the key management instructions stored in the non-volatile device memory may be defined to configure the processor to determine a given keying material value corresponding to the given encrypted file; determine a given keying value from the given keying material value using the key management process; determine a given key sequence using the plurality of seed bit partitions and the given keying value using the key management process; and generate a file decryption key from the given key sequence using the key management process; and generate a decrypted file by applying a decryption cipher to the given encrypted file to generate a plaintext file, where the decryption cipher uses a decryption cipher key to generate the plaintext file, and the file decryption key is used as the decryption cipher key for the decryption cipher when the decryption cipher is applied to the given encrypted file.

In some examples of a device for managing a plurality of encryption keys, determining the given keying material value corresponding to the given encrypted file comprises extracting the given keying material value from the encrypted file.

In some examples of a device for managing a plurality of encryption keys, the seed bit set length may be at least three times the specified key length, and the seed bit set length may be an integer multiple of the specified key length.

In some examples of a device for managing a plurality of encryption keys, the keystore seed may define an initial set of initial seed bits, where the initial set of initial seed bits has an initial set length less than the seed bit set length, and the seed bit set may be defined by appending zeros to the initial set of initial seed bits such that a combined length of the initial set of initial seed bits and the appended zeros equals the seed bit set length.

In some examples, the instructions stored in the non-volatile device memory may be defined to configure the processor to securely transmit the key management instructions and the keystore seed to a plurality of different computing devices, where the key management instructions and the keystore seed enable each different computing device to generate each encryption key in the plurality of encryption keys.

It will be appreciated by a person skilled in the art that a device, method or computer program product disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

The drawings included herewith are for illustrating various examples of systems, methods, and devices of the teaching of the present specification and are not intended to limit the scope of what is taught in any way.

DESCRIPTION OF EXEMPLARY EMBODIMENTS

Figure 1:
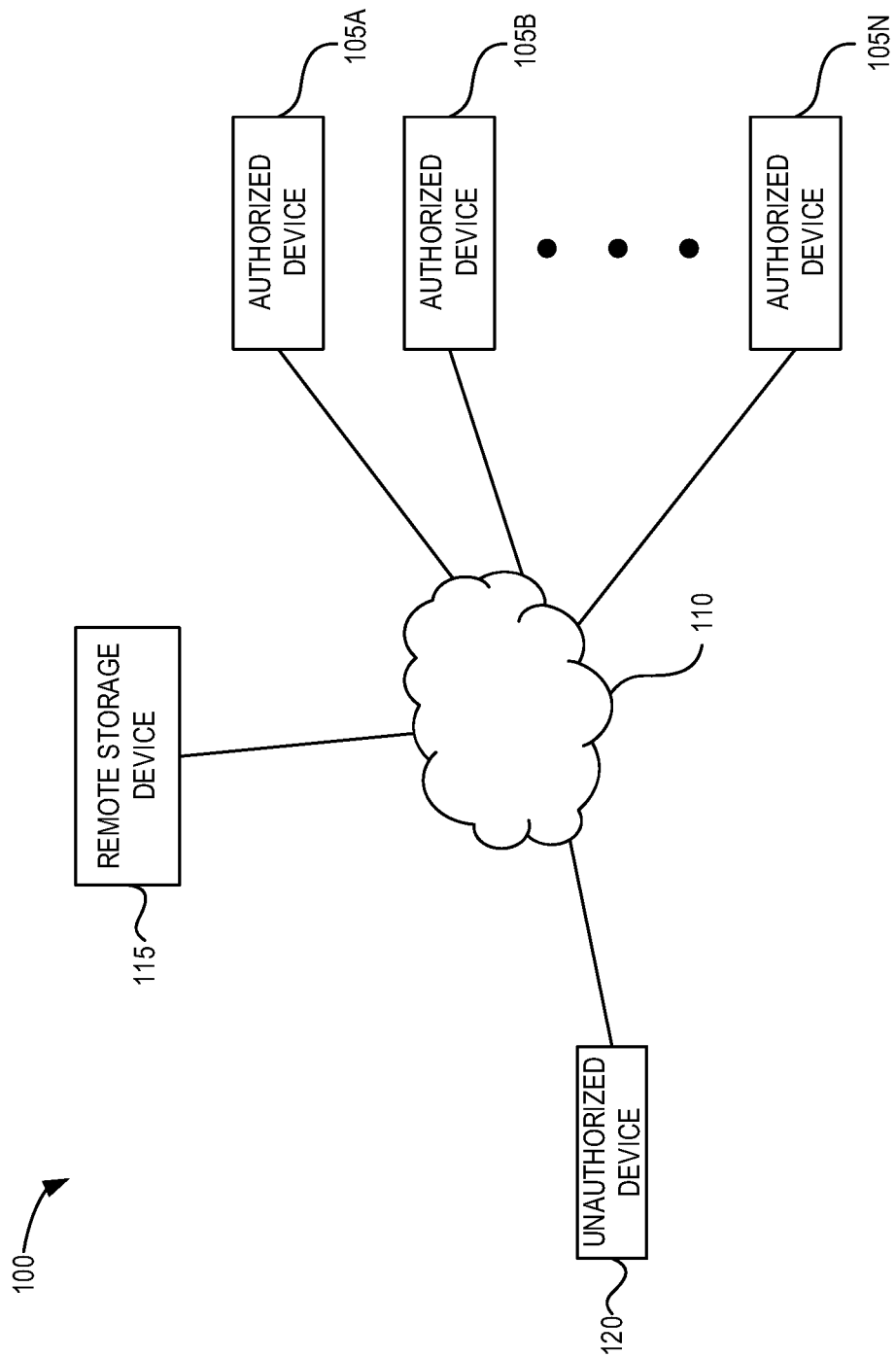
FIG. 1 is a block diagram illustrating an example computer system that can be used to provide encryption key generation and management for one or more computing devices in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

A computer program is a group of instructions that can be executed by a computer (i.e. by a processor). A process is an instance of a program, i.e. a copy of a program in computer memory that is ready to be executed by the computer's central processing unit(s) (CPUs). In the discussion that follows, reference is made to a processor of a computer system and operations performed by the processor of a computer system. It should be understood that such references encompass one or more processing elements and the use of one or more processing elements to perform operations, such as one or more processing cores within one or more CPUs.

Within a computer or computer system, data files are used to store information. When the information is stored in a directly readable/understandable manner (i.e. not obfuscated or otherwise coded to prevent direct understanding of the information), the data file may be referred to as being plaintext (e.g. a plaintext file). In some cases, the data files may be modified (i.e. encrypted) to prevent unauthorized access to the plaintext information stored by that data file.

Encryption is a process that uses a secret (an encryption key) to transform the information (i.e. the plaintext) into an obfuscated form (which may be referred to as ciphertext). A file containing information in an encrypted form may be referred to as a ciphertext file. Decryption is the reverse process of encryption and uses a secret (e.g. the encryption key or a different decryption key depending on the encryption method used) to transform ciphertext to plaintext.

Embodiments described herein relate generally to the management of a plurality of encryption/decryption keys. In particular, embodiments described herein relate to the management of a plurality of encryption keys that may be used with a secure symmetric encryption cipher. Embodiments described herein may provide systems, methods, devices, and computer program products that enable a large number of encryption keys to be securely generated, distributed and maintained while managing only a limited number of secret bits. Embodiments described herein may facilitate long-term data storage while maintain a high-level of data security.

Embodiments described herein may provide encryption key management for a symmetric encryption cipher. The symmetric cipher may be configured to receive a plaintext data file and generate a corresponding ciphertext file using an encryption key. The symmetric cipher can also be used to receive the ciphertext file and generate the corresponding plaintext data file using the same encryption key (which in this operation may be referred to as a decryption key).

Embodiments described herein can be configured to manage a plurality of encryption keys. This plurality of encryption keys may be referred to herein as a keystore and/or a set of keys and/or a set of random keys for example. The keystore may be represented herein by the symbol W. An individual key (also referred to as an encryption key and/or decryption key) may be represented by the symbol k.

The encryption cipher can be defined to operate using an encryption key having a specified key length. The specified key length (also referred to herein as the key length and/or number of key bits for example) may be represented herein by the symbol $1$. Each individual key in the plurality of encryption keys can be defined to have that same specified key length.

Within the keystore (i.e. amongst the plurality of encryption keys), individual encryption keys may be identified based on a key index value and/or keying material value. The keying material value may also be referred to herein, for example, as an index of a specific key in the keystore. The keying material value may be usable to determine a key derivation value or keying value that can be used to generate the corresponding encryption key. In some cases, the keying material value may even be the keying value itself. The keying material value may be represented herein by the symbol w. A particular keying material value for a given ith file may be represented herein by $X_i$. The set of all key indices of the keystore (also referred to as, for example, the set of keying material values for the keystore) may be represented by the symbol $\Omega$.

The plurality of encryption keys can include a large number of encryption keys. The number of encryption keys in the plurality of encryption keys may be represented by the symbol A. This number of encryption keys in the plurality of encryption keys (and the symbol A) may be referred to herein as the size of the keystore and/or the number of keys in the keystore and/or the number of key index values for the keystore and/or the quantity of independent keying material values for example.

Embodiments described herein may facilitate management of the plurality of encryption keys through management of a keystore seed that defines a set of secret bits. The secret bits may be referred to herein as a seed bit set. The plurality of seed bits in the seed bit set can be independent and identically distributed (IID) (i.e. uniformly random). The seed bit set may be usable to generate each key in the plurality of encryption keys (in other words, the keystore seed can be used to generate each key in the keystore). The keystore seed may be represented herein by the symbol K.

The size of the keystore seed may be much smaller than the number of encryption keys in the plurality of encryption keys. That is, the size of the seed bit set (i.e. the number of seed bits in the seed bit set) can be less than the size of the keystore (i.e. the number of keys in the keystore). The size of the keystore seed may be represented herein by the symbol L. The size of the keystore seed may also be referred to as the number of shared secret bits and/or the number of bits in the keystore seed and/or the number of seed bits in the seed bit set for example.

A key management process can be determined to manage the plurality of encryption keys. The key management process may define a function and/or a sequence of operations usable to generate the plurality of encryption keys. A key management process may be represented herein by the symbol G.

The key management process can specify a key mapping between the seed bit set and the plurality of encryption keys. The key mapping can be used to generate any (i.e. each and every) encryption key in the plurality of encryption keys from the seed bit set. For a specific encryption key in the plurality of encryption keys, the key mapping can specify how to generate that specific encryption key from the seed bit set using the keying material value corresponding to that encryption key. Through the use of the key management process, and the seed bit set, a large number of encryption keys may be securely managed and distributed in a simplified manner.

Embodiments described herein provide encryption key management processes in which, for any keying material value, the corresponding encryption key has a set of key bits that are random and uniformly distributed. Accordingly, distributing a randomly selected keying material value can disclose zero information about the corresponding encryption key.

Embodiments described herein provide encryption key management processes in which, for any distinct pair of keying material values, the difference between the corresponding pair of encryption keys is random and uniformly distributed.

Embodiments described herein provide encryption key management processes in which the transformation from the keystore seed to the corresponding keystore maintains the same total amount of secret information.

Embodiments described herein provide encryption key management processes in which, for any distinct pair of keying material values, knowing the corresponding encryption key for a first one of the keying material values does not significantly reduce the amount of uncertainty about the corresponding encryption key for the second one of the keying material values.

Embodiments described herein may also provide examples of key management processes that can be defined to protect against reconstruction attacks.

Referring now to FIG. 1, shown therein is an example of a system 100 that can be used for generating and managing encryption keys in accordance with an embodiment. In some embodiments, system 100 may form part of a security system that enables automatic encryption and decryption of data files on various authorized computing devices 105A-105N.

Devices 105 within system 100 may be configured to operate according to a specified key management process. The key management process may enable each device 105 to generate encryption keys using a stored keystore seed. The keystore seed may be stored by each device 105 as a set of secret bits. For example, the keystore seed may be stored in an encrypted manner on each device 105. The encryption keys can be used to encrypt and decrypt data files using a symmetric encryption cipher. This may allow the devices 105 to create, access and share encrypted data files, and/or store and access encrypted data file stored on a remote storage device 115, while preventing access to the underlying plaintext data by an unauthorized device 120.

In general, the computing devices 105 include a processor, volatile and non-volatile memory, at least one network interface, and input/output devices. Computing devices 105 may include server computers, desktop computers, notebook computers, tablets, PDAs, smartphones, or other programmable computers. Computing devices 105 may also encompass any connected or "smart" devices capable of data communication, such as thermostats, air quality sensors, industrial equipment and the like. Increasingly, this encompasses a wide variety of devices as more devices become networked through the "Internet of Things". An example of the computing devices 105 will be described in further detail with reference to FIG. 2.

The computing devices 105 may include a connection with a network 110, such as a wired or wireless connection to the Internet. The network 110 may be constructed from one or more computer network technologies, such as IEEE 802.3 (Ethernet), IEEE 802.11 and similar technologies.

The computing devices 105 may be connected to a remote storage device 115 such as a cloud server over network 110. The remote storage device 115 may include one or more server computers connected to a computing device 105 using a network such as the internet. The remote storage device 115 generally includes a processor, volatile and non-volatile memory, and at least one network interface and may provide data storage services for the authorized computing devices 105. Data stored on remote storage device 115 may be accessible by the computing devices 105 using the network 110.

Examples of existing key management techniques include the PGP type of solution (see e.g. P. Zimmermann. *PGP Source Code and Internals*. MIT Press, 1995) in which keys are distributed along with the encrypted files in the form of ciphertext (that is, the keys are encrypted with receiving parties' public keys), and the key derivation type of solution in which keys are derived from a secret value such as a master key, a password, etc. (possibly) along with a random nonce (see e.g. M. Bezzi, et al. Data privacy, in J. Camenisch, editor, *Privacy and Identity Management for Life*, Springer, 2011). In the former case, although keys for different files can be made independent in theory, distributing the keys in the public-key encrypted form discloses all information about them from an information theoretic perspective (as the public keys are also accessible to attackers). In the later case, derived keys for different files may be strongly correlated and each derived key may also be correlated with the respective nonce. Accordingly, disclosing the nonce also discloses information about the key. In order to provide data security, these shortcomings force users to adopt a short life cycle of the private keys and secret value used to generate the encryption keys. As a result, these techniques are not particularly suited for large-scale key management and/or applications requiring long term data protection.

Embodiments described herein may provide systems and methods for key generation and management that may address a number of key management problems from an information theoretic perspective. In embodiments described herein, systems and methods may be defined to operate with a shared secret K of L random bits between/among legitimate parties (e.g. authorized devices 105). The systems and methods described herein can be defined to operate on the assumption that an adversary (e.g. unauthorized device 120) can observe the same information as each legitimate receiver (e.g. authorized devices 105) except the shared secret K and that the shared secret is unknown to the adversary. The systems and methods described herein can be defined to operate using an underlying secure symmetric cypher (e.g. AES) that uses keys with a specified key length l.

The systems and methods for key generation and management described herein may define processes for securely (from an information theoretic perspective) generating, distributing, and maintaining a large number A of random encryption keys of key length l using an underlying secure symmetric cipher. Embodiments described herein can be configured to operate under the practical limitation that a user can manage a relatively small number L of shared secret bits K, where the number of shared secret bits is much less than the number of random encryption keys (e.g. $L<<A\leq2^l$).

A key index set $\Omega$ corresponding to the shared secret bits can be defined with a key index set cardinality equal to the number of random encryption keys A. The elements of the key index set $\Omega$ can act as key indices (also referred to as keying material values) for the set of encryption keys in the plurality of encryption keys. A key management process G can be determined that defines a mapping between the shared secret bits (i.e. the seed bit set) and the plurality of encryption keys (e.g. $G:\{0,1\}^L \times \Omega \to \{0,1\}^l$). The key management process can be defined so that for each key index value in the key index set (i.e. for each $\omega \in \Omega$) the corresponding encryption key (i.e. $k(\omega)=G(K,\omega)$) can be easily computed from the seed bit set K and the key index value $\omega$. Thus, the corresponding encryption key $k(\omega)$ may be distributed implicitly by distributing the key index value $\omega$. Accordingly, the maintenance of the large set of keys $\Psi = \{k(\omega):\omega \in \Omega\}$ can be reduced to maintenance of the shared secret K.

The systems and methods described herein can be defined without any assumptions on the computational resources of the adversary. Embodiments described herein may be configured to provide key management process designed to address challenges associated with securely generating, distributing, and maintaining a large, growing list of random keys using a concept referred to herein as information-theoretically $\beta$-secure key management. The present application also provides a key management framework within which information-theoretically $\beta$-secure key management processes can be designed, analyzed, and compared.

In embodiments described herein, information-theoretical $\beta$-security can be used to measure the security of a key management process G. Key management processes G described herein can be defined to be information-theoretically $\beta$-secure. As used herein, a key management process can be considered information-theoretically $\beta$-secure if:

for any key index value $\omega \in \Omega$, the key bits in the corresponding encryption key $k(\omega)$ are random and uniformly distributed over $\{0,1\}^l$. Accordingly, distributing a randomly selected key index value $\omega$ discloses zero information about the corresponding key $k(\omega)$, for any distinct pair of key index values $\omega_1, \omega_2 \in \Omega$, the difference between the pair of corresponding encryption keys (i.e. the difference between $k(\omega_1)$ and $k(\omega_2)$) is random and uniformly distributed over $\{0,1\}^l$;

the transformation from the keystore seed to the keystore (i.e. the transformation $K \to \Psi$) keeps the same total amount of secret information; and for any independent key index values $\{X_j\}_{j=1}^{n+1}$, knowing a first encryption key $\{k(X_j)\}_{j=1}^{n}$ corresponding to a first key index value does not reduce the amount of uncertainty about a second encryption key $k(X_{n+1})$ corresponding to a second key index value significantly. In other words, a conditional Shannon entropy of the second encryption key given the second key index value and the first encryption key is greater than the conditional Shannon entropy of the second encryption key given the second key index value alone by, at most, a minimal value $\beta_n$ i.e., $H(k(X_{n+1})|\{X_j\}_{j=1}^{n+1}, \{k(X_j)\}_{j=1}^{n}) \geq \beta_n \times H(k(X_{n+1})|X_{n+1})$, where $H(X|Y)$ is the conditional Shannon entropy of X given Y, and $\beta_n$ is close to 1 for small n.

Embodiments described herein can define information-theoretically $\beta$-secure methods with improved strength against attacks. A specific example of a key management process operable to information-theoretically $\beta$-secure key management, referred to herein as G*, is illustrated. Examples of variants of the key management process usable to protect against reconstruction attacks are also described herein.

Figure 3:
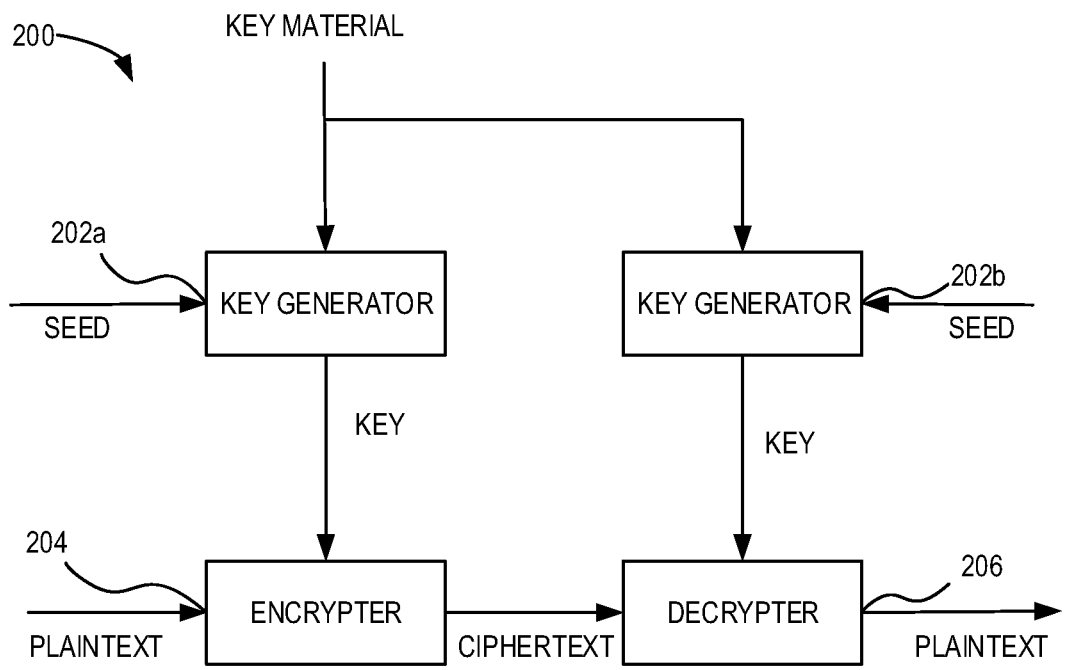
FIG. 3 is a flow diagram illustrating an example key management process in accordance with an embodiment.

As shown in the example of FIG. 3, a key management process 200 (i.e. G) as defined herein can be configured to generate a plurality of encryption keys that includes a large number A of random keys. Each encryption key can have a specified key length l. Together, the plurality of encryption keys form a set $\Psi$ that may be referred to as a keystore. A shared secret K, also referred to as the keystore seed can be provided to any authorized user(s). The shared secret can define a seed bit set that includes a specified number L of seed bits. A keying material index $\Omega$ can be defined as a key index set or keying material set with a cardinality equal to the number of keys in the plurality of encryption keys A. The number of seed bits can be much smaller than the number of keys in the plurality of encryption keys (i.e. $L \ll \Lambda \leq 2^l$). Each keying material value in the keying material set $\Omega$ can be used as keying material for a corresponding encryption key. Each keying material value may be represented by $\lceil \log \Lambda \rceil$ bits.

Given any keying material value $\omega \in \Omega$, the corresponding (random) encryption key $k(\omega)$ can be generated from the shared secret K (i.e. from the seed bit set) using the key management process G as $k(\omega)=G(K, \omega)$. Accordingly, the keystore $\Psi$ generated by the key management process G from the keystore seed K can be defined as $$\Psi = \{k(\omega):\omega \in \Omega\}$$

where the keying material value $\omega$ may also be referred to as a key index value.

When an unecrypted file (e.g. a plaintext file) is to be encrypted at 204, a keying material value $\omega$ can be selected from the keying material set $\Omega$. The keying material value may be selected randomly. The key mapping defined by the key management process G can then be used to generate the corresponding encryption key $k(\omega)$ from the seed bit set K and the keying material value $\omega$ at 202a. This operation may be considered equivalent to randomly selecting a key $k(\omega)$ from the keystore W. The generated $k(\omega)$ can then be used as the encryption key to encrypt the file (i.e. generate ciphertext data) via an underlying symmetric cipher at 204.

The keying material value (or key index value) $\omega$ can then be included with the ciphertext as an encrypted file. The keying material value $\omega$ and the ciphertext may together define the encrypted file. For example, the keying material value may be inserted into the header of the ciphertext. Upon receiving the encrypted file at 206, a legitimate receiving party (e.g. an authorized user 105) can determine the keying material value based on the received encrypted file. The authorized user device 105 can extract the key $k(\omega)$ from the seed bit set K and the keying material value $\omega$ using the key mapping at 202b. The derived key $k(\omega)$ can then be used to decrypt the ciphertext at 206. In general, as used herein, the term "file" may be understood to represent a "message", "plaintext", or more generally a piece of information/data except where otherwise specified (e.g. where a file is specified to be encrypted or ciphertext).

Figure 2:
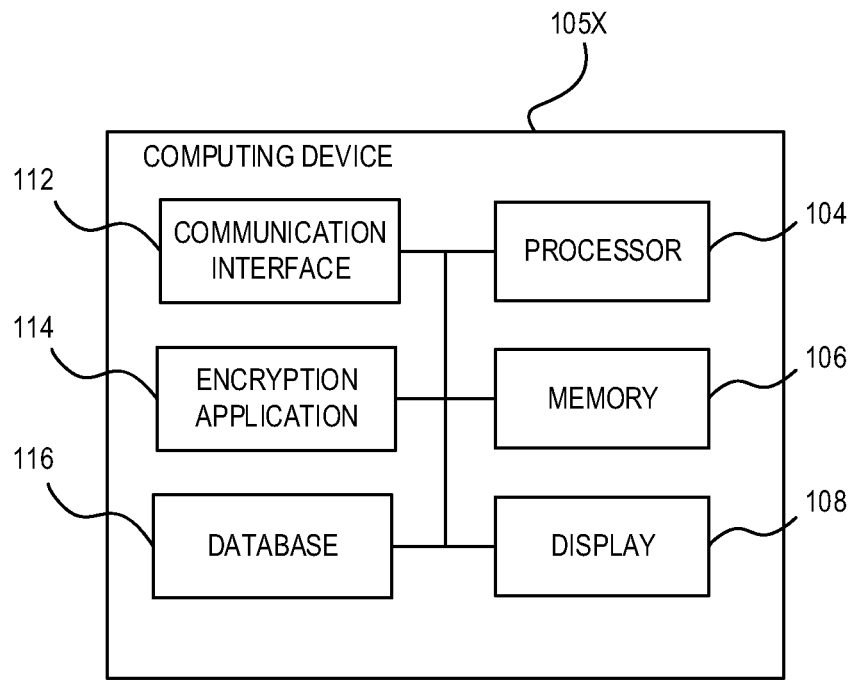
FIG. 2 is a block diagram illustrating an example computing device that may be used with the example system of FIG. 1 in accordance with an embodiment.

Referring now to FIG. 2, shown therein is an example of a computing device 105X that can be used for generating and managing encryption keys in accordance with an embodiment. In general, computing device 105X illustrates additional details of a computing device 105 associated with an authorized user of system 100. The details of the example computing device 105X may be generally extended to the various other computing devices 105 shown in FIG. 1. Examples of computing devices 105 may include suitably-programmed general purpose computers, audio/video encoding and playback devices, set-top television boxes, television broadcast equipment, and mobile devices for example.

The computing device 105X generally includes a processor 104, a memory 106, a display 108, a database 116, and a communication interface 112. Although shown as separate elements, it will be understood that database 116 may be stored in memory 106.

The processor 104 is a computer processor, such as a general purpose microprocessor. In some other cases, processor 104 may be a field programmable gate array, application specific integrated circuit, microcontroller, or other suitable computer processor.

Processor 104 is coupled, via a computer data bus, to memory 106. Memory 106 may include both volatile and non-volatile memory. Non-volatile memory stores computer programs consisting of computer-executable instructions, which may be loaded into volatile memory for execution by processor 104 as needed. It will be understood by those of skill in the art that references herein to computing device 105 as carrying out a function or acting in a particular way imply that processor 104 is executing instructions (e.g., a software program) stored in memory 106 and possibly transmitting or receiving inputs and outputs via one or more interface. Memory 106 may also store data input to, or output from, processor 104 in the course of executing the computer-executable instructions. As noted above, memory 106 may also store database 116.

Processor 104 is also coupled to display 108, which is a suitable display for outputting information and data as needed by various computer programs. In particular, display 108 may display a graphical user interface (GUI). In some cases, the display 108 may be omitted from computing device 105, for instance where the computing device 105 is a sensor or other smart device configured to operate autonomously. Computing device 105 may execute an operating system, such as Microsoft Windows™, GNU/Linux, or other suitable operating system.

In some example embodiments, database 116 is a relational database. In other embodiments, database 116 may be a non-relational database, such as a key-value database, NoSQL database, or the like.

Communication interface 112 is one or more data network interface, such as an IEEE 802.3 or IEEE 802.11 interface, for communication over a network.

The processor 104 may operate based on instructions provided in applications stored in memory 106. As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

The computing device 105X may have stored thereon a software application referred to as an encryption application 114. Although shown separately, it should be understood that encryption application 114 may be stored in memory 106.

Each computing device 105 (or at least each authorized computing device) may have an encryption application 114 installed thereon. The encryption application 114 installed on each device 105 may be responsible for the encryption and decryption operations on that device 105. The encryption application 114 may be configured to determine a key management process to be used in generating and managing encryption keys.

For example, encryption application 114 may be configured to generate encryption/decryption keys according to the determined key management process. Encryption application 114 may be defined to protect the keys once generated. The encryption application 114 may also store one or more keystore seeds on each device 105 and/or generate one or more keystore seeds which can be stored on each device 105. The keystore seeds can be used by the encryption application 114 to generate one or more encryption/decryption keys according to the key management process.

The encryption application 114 can be used to generate keystore seeds. The keystore seeds can then be used to derive keys using a key management process as will be described in further detail below. Keystore seeds used on devices 105 may be shared and/or synchronized with other authorized devices 105 for instance, as described in U.S. Pat. No. 9,619,667 entitled "METHODS, SYSTEMS AND COMPUTER PROGRAM PRODUCT FOR PROVIDING ENCRYPTION ON A PLURALITY OF DEVICES". Synchronizing keystore seeds between different devices 105 may enable different devices to communicate ciphertext files between devices 105 in a secure manner, while still providing for easy encryption and decryption of the ciphertext files. Encryption application 114 may be configured to securely transmit the keystore seed to a plurality of different computing devices 105. Encryption application 114 may also be configured to securely transmit key management instructions to a plurality of different computing devices 105. The key management instructions and the keystore seed may enable each different computing device 105 to generate each encryption key in the plurality of encryption keys.

In some cases, a user may wish to move encrypted files/ciphertext from a first device 105A to a second device 105B and/or to remote storage device 115. The first user may transmit one or more encrypted files/ciphertext from the first device 105A to a second device 105B in various ways such as using cloud services, telecommunications networks or other file transfer mechanisms such as a USB or Firewire key. Once the files have been received at the second device 105B, it may be necessary to decrypt the files on the second device 105B.

To allow encrypted files/ciphertext that were encrypted by the encryption application 114 on the first device 105A to be decrypted by the encryption application 114 on the second device 105B, the keystore seed(s) used by the encryption application 114 on the first device 105A and second device 105B may be synchronized, either manually or automatically. Thus, the encryption application 114 on the second device 105B may be able to determine the encryption key for decrypting the received file using the keystore seed and keying information (e.g. a keying material value) transmitted along with the received file according to the determined key management process. Furthermore, the data may be secure against decryption during transmission as the keying information and the encryption key may have zero mutual information, such that the keying information and the encryption key are statistically independent, which may prevent an attacker from determining the encryption key from the transmitted ciphertext and keying information alone.

In some cases, the encryption application 114 may be configured to generate a large set of encryption keys, i.e., an encryption keystore, from the keystore seeds. However, as noted above, it may be undesirable or unwieldy for the computing device 105 to generate and store a large set of encryption keys, e.g. if the device 105 has limited storage capacity. Accordingly, the device 105 may store only the keystore seed and then derive encryption keys from the keystore seed as needed using the key management process.

The encryption keys and/or keystore seeds can be stored in non-volatile device memory 106 in encrypted format. The encryption keys and/or keystore seeds may be protected by a verification code defined by the user. In some embodiments, the verification code may be known only to the user. Local authentication information can be generated based on the verification code and stored on device 105. The authentication information can be used to authenticate a user attempting to access or modify encrypted files. In some cases, the verification code may not be determinable from any of the stored authentication information. Further details regarding secure storage of encryption keys and keystore seeds using a verification code are described in the U.S. Pat. No. 9,619,667 entitled "METHODS, SYSTEMS AND COMPUTER PROGRAM PRODUCT FOR PROVIDING ENCRYPTION ON A PLURALITY OF DEVICES".

Data managed by the example systems described herein may remain encrypted at all times when stored in non-volatile memory—whether on authorized devices 105 or other devices, such as a remote storage device 115. In some examples, encryption application 114 may be configured to generate the encryption/decryption keys on an as-required basis. For example, encryption application 114 may not store any encryption keys in non-transitory memory on device 105. In such cases, encryption keys may be stored temporarily in transitory memory of the device 105 and then discarded once the encryption and/or decryption process is complete.

FIG. 3 illustrates an example key management process 200 that may be used by the encryption application 114. Key management process 200 illustrated in FIG. 3 may be an example of key management process G described briefly herein above.

In key management process G, the symbol $X_i$ can be used to represent the random keying material value selected to encrypt an ith file. The plurality of keying material values $\{X_i\}_{i=1}^{\infty}$ can be defined as a sequence of independent and identically distributed (IID) random key material variables with each individual keying material value $X_i$ being uniformly distributed over the set of keying material values $\Omega$.

As the number of encrypted files increases, the list of random keys required to separately encrypt all those files is $k(X_1), k(X_2), \ldots, k(X_n)$, where n represents the total number of files encrypted. Using the key management process G, each encryption key $k(X_i)$, $1 \le i \le n$, can be distributed implicitly by way of distributing its corresponding keying material value or key index value $X_i$.

The key management process G can be defined such that each keying material value $X_i$ and the corresponding encryption key $k(X_i)$ are statistically independent. Accordingly, the mutual information $I(X_i; k(X_i))$ between each keying material value $X_i$ and the corresponding encryption key $k(X_i)$ is zero. As such, disclosing the keying material value $X_i$ discloses zero information about the actual key $k(X_i)$.

In addition, the key management process G can be defined such that the key bits of each of the encryption keys are required to be uniformly distributed over $\{0,1\}^l$, the key bits of all of the encryption keys are required to be substantially different from the key bits of all other encryption keys in the plurality of encryption keys and accidentally disclosing one or more encryption keys would not provide an unauthorized user with much of an advantage to attack other encryption keys. These properties can be defined as requirements of processes considered to provide information-theoretically β-secure key management as further described herein below.

Using a key management process G as described herein enables each encryption key $k(X_i)$ to be computed from the seed bit set defined by the keystore seed K and a key derivation value (also referred to as a keying value) corresponding to the keying material value/key index value $X_i$. Accordingly, a device 105 need not actually store the keystore Ψ (i.e. no need to store all of the encryption keys in the plurality of encryption keys). Accordingly, using an information-theoretically β-secure key management process G as described herein allows the management of a large, growing list of random keys to be achieved by managing the seed bit set of a single keystore seed K. This may greatly reduce or alleviate the challenge of key management for long term data protection.

Given a specified key length l for each encryption key, a specified number of seed bits $L \ge 2l$ for the seed bit set, and a number of encryption keys Λ in the plurality of encryption keys satisfying $L \ll \Lambda \le 2^l$, many different embodiments of information-theoretically β-secure key management processes can be defined. Examples of key management processes that may may provide optimal information-theoretically β-secure key management are described in further detail herein below.

Defining a keystore seed entropy value f as a floor of the ratio of the specified number of seed bits to the specified key length (i.e. $f = \lfloor L/l \rfloor$), it can be shown that an information-theoretically β-secure key management process G is optimal if and only if for any distinct keying material values $\omega_1, \omega_2, \ldots \omega_f, \omega_{f+1}$ from the set Ω of keying material values for the keystore, the corresponding set of encryption keys $k(\omega_1), k(\omega_2), \ldots, k(\omega_f)$ are Independently and Identically Distributed (IID), and the joint entropy of the corresponding set of encryption keys $k(\omega_1), k(\omega_2), \ldots, k(\omega_{f+1})$ is equal to the length of the keystore seed L. A specific example of an optimal information-theoretically β-secure process, namely G*, is described herein, and some example variants of the example process that may further protect against reconstruction attacks are further described.

Ever since Shannon's work on perfect secrecy (see e.g. C. Shannon, "Communication theory of secrecy systems," *Bell System Technical Journal*, 28(4): 656-715, 1949), information theoretic approaches have been mainly applied to secure communication under various, often unrealistic assumptions (see e.g. U. Maurer, "Conditionally-perfect secrecy and a provably-secure randomised cipher," *Journal of Cryptology*, 5(1): 53-66, 1992; U. Maurer, "Secret key agreement by public discussion from common information," *IEEE Trans. Inform. Theory*, 39(3): 733-742, 1993; R. Ahlswede and I. Csiszár, "Common randomness in information theory and cryptography—Part I: secret sharing," *IEEE Trans. Inform. Theory*, 39(4): 1121-1132, 1993; A. D. Wyner, "The wire-tap channel," *Bell Syst. Tech. J.*, 54(8): 1355-1387, 1975; C. Fragouli, V. M. Prabhakaran, L. Czap, and S. N. Diggavi, "Wireless network security: building on erasures," *Proceedings of the IEEE*, 103(10): 1826-1840, 2015; and references therein). Shannon has shown that perfect secrecy is achievable if and only if the entropy of the key of a cipher is greater than or equal to that of the plaintext, which implies the perfect secrecy of the one-time pad (see e.g. C. Shannon, "Communication theory of secrecy systems," *Bell System Technical Journal*, 28(4): 656-715, 1949). Limiting the adversary to certain types of attacks, it has been shown that when properly designed, a randomized cipher can achieve perfect secrecy with high probability by using a key much shorter than that of the plaintext (see e.g. U. Maurer, "Conditionally-perfect secrecy and a provably-secure randomised cipher," *Journal of Cryptology*, 5(1): 53-66, 1992).

However, the randomized cipher implies the existence of a very long publicly accessible string of random bits, which is much longer than that of the plaintext. Under the assumption that the sender and receiver each observes a different, but correlated source, secret sharing has been investigated from an information theoretic point of view with a focus on the determination of key capacity (see e.g. U. Maurer, "Secret key agreement by public discussion from common information," *IEEE Trans. Inform. Theory*, 39(3): 733-742, 1993; and R. Ahlswede and I. Csiszár, "Common randomness in information theory and cryptography—Part I: secret sharing," *IEEE Trans. Inform. Theory*, 39(4): 1121-1132, 1993). On the other hand, in the wire-tap channel model (see e.g. A. D. Wyner, "The wire-tap channel," *Bell Syst. Tech. J.*, 54(8): 1355-1387, 1975) the adversary is assumed to observe information different from the legitimate receiver through a different channel, and the focus of such models is often on the determination of secrecy capacity. Recent approaches to wireless network security make a similar type of assumption (see e.g. C. Fragouli, V. M. Prabhakaran, L. Czap, and S. N. Diggavi, "Wireless network security: building on erasures," *Proceedings of the IEEE*, 103(10): 1826-1840, 2015). However, none of these approaches deal with the challenges of maintaining the secrecy of a large number of random keys even after these keys are securely distributed to legitimate parties (e.g. authorized devices 105).

In contrast, embodiments described herein provide systems and methods configured to address the challenge of key management using an information theoretic approach. In particular, embodiments described herein may be configured to operate under the condition that a user or device can deal only with a finite number of secrets (i.e. a finite number of secret bits), which is certainly the case in practical applications as compared to theoretical applications which may allow for an infinite size of secret. Accordingly, embodiments described herein may be configured to address methods of securely generating, distributing, and maintaining a growing list of random keys in practice. The inventor has previously described some examples of information-theoretically secure key management processes (see e.g. E.-H. Yang and X.-W. Wu, "Information-Theoretically Secure Key Generation and Management," in *Proc. of the 2017 IEEE International Symposium on Information Theory* (ISIT 2017), Aachen, Germany, Jun. 25-30, 2017, pp. 1529-1533; and E.-H. Yang, "Methods and computer program products for encryption key generation and management," U.S. Pat. No. 9,703,979, Jul. 11, 2017).

In the description herein below, Section 2, provides a formal definition of the concept of information-theoretically β-secure key management, defines how to determine an optimal information-theoretically β-secure key management process, and establishes some general bounds concerning information-theoretically β-secure key management. Section 3 provides a description of example optimal information-theoretically β-secure key management processes with a more detailed explanation of a specific optimal information-theoretically β-secure key management process G*. Section 4 describes example variants of G* in conjunction with an underlying secure symmetric cypher that may be used to protect a keystore seed against so-called reconstruction attacks.

Section 2—Information Theoretically β-Secure Key Management

As noted above, embodiments described herein can be defined to operate with encryption keys having a specified key length l. Each encryption key is defined by a plurality of key bits. The encryption key has a specified key length l and the specified key length is the same for each encryption key. The specified key length defines the number of key bits in the plurality of key bits for each encryption key.

Embodiments described herein can make use of a keystore seed that defines a seed bit set. The seed bit set can be defined with a seed bit set length L that specifies the number of seed bits in in the seed bit set. The seed bit set length can be defined to be at least twice the specified key length (i.e. L≥2l). Embodiments described herein can be configured to operate with a number of encryption keys A in the plurality of encryption keys that is much greater than the seed bit set length and at most two to the power of the specified key length (i.e. L<<Λ≤$2^l$).

As explained above, the key index set Ω can be defined as a set consisting of a number of keying material values, with that number equal to the number of encryption keys A, and each keying material value representing or corresponding to a key index value or keying derivation value/keying value.

K is a shared secret (or keystore seed) that can be stored (e.g. by encryption application 114) in the non-transitory memory 106 of one or more computing devices 105. The keystore seed may enable each encryption key in the plurality of encryption keys to be generated. The keystore seed can define a seed bit set having a plurality of seed bits, for example a seed bit set of L random bits. The keystore seed K can define the seed bit set as a seed bit sequence of bits:

$$K=K(0)K(1)\ldots K(L-1)$$

where the plurality of seed bits K(i), i=0,1, . . . , L−1 in the seed bit set are independent and identically distributed (IID) bits over {0,1} with each seed bit having an equal probability of being a one or a zero, i.e.

$$Pr\{K(i)=0\}=Pr\{K(i)=1\}=\tfrac{1}{2}$$

Accordingly, the seed bits in the seed bit set will be described herein as being uniformly random.

Definition 1

With reference to FIG. 3, the computing device 105 can be configured to determine a key management process G (e.g. using encryption application 114). The key management process can define a key mapping between the seed bit set and the plurality of encryption keys (i.e. $\{0,1\}^L \times \Omega$ to $\{0,1\}^l$).

The key management process may be usable by the processor 104 of the computing device 105 to generate each encryption key in the plurality of encryption keys. The key management process may specify how to generate each encryption key from the seed bit set using the key mapping and a keying material value corresponding to that encryption key.

The key management process G can be used for key management in various ways. The key management process can be used to generate each encryption key in the plurality of encryption keys. The key management process can specify how to generate each encryption key from the seed bit set using the key mapping and a keying material value corresponding to that encryption key.

For example, the key management process may be used to provide encryption for one or more plaintext files, as shown at 204. The encryption application 114 can identify a plaintext file to be encrypted. The encryption application 114 can then generate an encryption key for the identified file as shown at 202a.

The encryption application 114 may randomly select a keying material value. The encryption application 114 can then determine a keying value from the particular keying material value using the key management process G. The keying value can be used to generate the encryption key from the plurality of seed bits stored by the device 105. For example, the keying value may be the keying material value itself and/or another value derivable or determinable from the keying material value.

For example, when a file is to be encrypted, a keying material value CO can be selected randomly from the set of keying material values $\Omega$. The corresponding key can then be generated from the selected keying material value. For example, the key indexed by $\omega$ can be generated as $k(\omega)=G(K,\omega)$.

The encryption application 114 can be used to generate an encrypted file by applying an encryption cipher to the identified file to generate a ciphertext file. The encryption cipher can be a symmetric cipher defined to use a cipher key to generate the ciphertext file. The generated encryption key $k(\omega)$ can be used as the cipher key to generate a ciphertext file from the plaintext file via the underlying symmetric cipher when the encryption cipher is applied to the file. The encrypted file can then be generated using the ciphertext file. For example, the encrypted file may include the ciphertext file and file keying material (keying information) corresponding to the particular keying material value used to generate the encryption key $k(\omega)$.

As another example, the key management process may be used to provide key distribution to a plurality of devices. An encryption key $k(\omega)$ may be distributed implicitly to all legitimate parties (authorized devices 105) using the corresponding keying material value. The keying material value (e.g. a key index CO) can be included with the ciphertext file as the encrypted file. For example, the keying material value can be inserted into the header of the ciphertext. The file keying material corresponding to the keying material value and the ciphertext file can together define the encrypted file.

The key management process may also be used to provide decryption as shown at 206. The encryption application 114 can identify an encrypted file to be decrypted. The encrypted file may be identified from various locations, for instance stored on the device 105, received from another device 105 and/or stored on remote storage device 115.

The encryption application 114 can then determine a keying material value corresponding to the encrypted file. In some cases, the keying material value may be extracted from the encrypted file, for instance where the keying material value is included with a ciphertext file to form the encrypted file.

A keying value can be determined from the keying material value using the key management process. For example, the keying value may be the keying material value and/or another value derivable or determinable from the keying material value.

The encryption application 114 may then determine the decryption key based on the keying value and the seed bit set stored on the device 105 at 202b. The encryption application 114 may extract or derive the key $k(\omega)$ from the keystore seed K using the keying value corresponding to the keying material value $\omega$. The key $k(\omega)$ can then be used to decrypt the ciphertext of the encrypted file.

The encryption application 114 can be configured to generate a decrypted file by applying a decryption cipher to the encrypted file in order to generate a plaintext file. The decryption cipher can operate using the same symmetric cipher as was used to encrypt the file. The decryption cipher can use a decryption cipher key to generate the plaintext file. The encryption application can use the key $k(\omega)$ as the decryption cipher key for the decryption cipher when the decryption cipher is applied to the encrypted file.

As another example, the key management process can be used to provide encryption key maintenance. The list of random keys that can be used is defined as the keystore $\Psi$.

$$\Psi=\{k(\omega)=G(K,\omega):\omega\in\Omega\}.$$

The keystore can define the set of encryption keys in the plurality of encryption keys. Maintaining the secrecy of this vast list of keys can be simplified to maintaining the secrecy of the single keystore seed K (i.e. maintaining the secrecy of the seed bit set).

As noted above, in embodiments described herein the key index set cardinality $\Lambda$ of the key index set $\Omega$ can be specified to be no greater than two to the power of the specified key length (i.e. $2^l$). Since each key has the specified key length l, the maximum number of different keys given the keystore seed K can be defined to be no greater than $2^l$. Additionally, each keying material value can be defined with a keying bit length that is at least a logarithm of the number of encryption keys (i.e. $\lceil \log \Lambda \rceil$ bits are required to represent each element $\omega\in\Omega$).

In embodiments described herein, the key material value $\omega$ can be distributed to legitimate parties (i.e. authorized devices 105). Accordingly, an unnecessarily large size $\Lambda$ of the key index set would increase the resulting transmission overhead. Take, for example, the underlying symmetric cipher to be AES256. Depending on the particular application, typical values for the size $\Lambda$ of the key index set (i.e. the number of encryption keys in the plurality of encryption keys) may be defined from $2^{53}$ to $2^{256}$ while the size L of the seed bit set can be as small as $2^{12}$. That is, the size of the seed bit set may be substantially smaller than the number of encryption keys that can be generated from that seed bit set (e.g. by a factor of at least $2^{41}$ in some examples).

The symbol $X_i$ can be used to represent a specific keying material value $\omega\in\Omega$ selected when an ith file is encrypted. As explained above, the plurality of keying material values are independently and identically distributed and accordingly $\{X_i\}_{i=1}^{\infty}$ can be IID. A process evaluation value $\beta=\{\beta_n\}_{n=1}^{\infty}$ can be defined as a sequence of nonincreasing numbers such that $0<\beta_n\le 1$, n=1, 2, ..., and $$\Sigma_{n=1}^{\infty}\beta_n\infty$$

For small values of n, $\beta_n$ can be defined to be close to 1. For embodiments of the key management processes described herein (key management processes that comply with Definition 1) to be both practical and secure, each key $k(\omega)$ can be required to be easily computed from the keystore seed K and corresponding keying material value $\omega$, and G can be required to be information-theoretically $\beta$-secure, as defined herein below.

Definition 2

In embodiments described herein, a key management process G can be said to be information-theoretically $\beta$-secure when the following four properties hold:

Property 1 of Definition 2: For each keying material value, the key bits in the encryption key corresponding to that keying material value are random and uniformly distributed. In other words, for any $\omega\in\Omega$, $k(\omega)$ is random and uniformly distributed over $\{0,1\}^l$. Accordingly, the mutual information between a randomly selected keying material value and the corresponding encryption key is zero.

Property 2 of Definition 2: For any pair of distinct keying material values, an element-wise binary subtraction of the key bits in the corresponding pair of encryption keys is random and uniformly distributed. In other words, for any two distinct $\omega_1, \omega_2 \in \Omega$, $k(\omega_1) \oplus k(\omega_2)$ is random and uniformly distributed over $\{0,1\}^l$, where $\oplus$ denotes the element-wise binary subtraction.

Property 3 of Definition 2: The Shannon entropy of the keystore seed is equal to the Shannon entropy of the plurality of encryption keys. In other words, the transform $K \rightarrow \Psi$ keeps the total amount of secret information, i.e., $$H(\Psi) = H(K) = L$$

where $H(X)$ stands for the Shannon entropy of random variable or vector $X$ as the case may be.

Property 4 of Definition 2: The conditional Shannon entropy of a first encryption key given both a second encryption key and the corresponding second keying material value is not less than the specified key length l multiplied by a process evaluation value (i.e. $\beta_n \times l$), where the first encryption key corresponds to a first keying material value and the second encryption key corresponds to any other keying material value. In other words, for any n and any distinct positive integers $i_1, i_2 \ldots, i_n, i_{n+1}$, $$H(k(X_{i_{n+1}}) | \{X_{i_j}\}_{j=1}^{n+1}, \{k(X_{i_j})\}_{j=1}^{n})$$

$$\geq \beta_n \times H(k(X_{i_{n+1}}) | X_{i_{n+1}})$$

$$= \beta_n \times l$$

where $H(X|Y)$ stands for the conditional Shannon entropy of a random variable $X$ given random variable $Y$.

Property 1 implies that each key $k(\omega)$ in the keystore $\Psi$ is strong, and that the mutual information $I(k(X_i); X_i)$ between each encryption key $k(X_i)$ and the corresponding keying material value $X_i$ is zero. Thus, distributing the keying material value $X_i$ does not disclose any information on the key $k(X_i)$ itself, if the keystore seed is unknown. Property 2 implies that when the number of encrypted files is much less than the total number of encryption keys $\Lambda$ in the plurality of encryption keys (which can be ensured in practice with $\Lambda$ defined to be extremely large) there is a high probability that all the encryption keys used to encrypt data files are very different from each other. In particular, for any $i \neq j$, $$Pr\{k(X_i) = k(X_j)\} = \qquad (1)$$
$$Pr\{k(X_i) = k(X_j), X_i = X_k\} + Pr\{k(X_i) = k(X_j), X_i \neq X_j\} =$$
$$(1 - 1/\Lambda) 2^{-l}$$

which implies essentially collision free keys.

From Property 3 and the strong law of large numbers, it follows that $$\lim_{n \to \infty} H(\{k(X_i)\}_{i=1}^{n} | \{X_i\}_{i=1}^{n}) = H(\Psi) = L \qquad (2)$$

This, in turn, implies that the total amount of secret information is spread across all used keys without any waste as the number of encrypted files increases.

Property 4 implies that disclosing (accidentally or otherwise) one or several used keys does not significantly reduce the amount of uncertainty about other keys. Taking all of these factors together, an information-theoretically $\beta$-secure G with $\beta_n$ close to 1 for small n can provide a desirable solution to key management, especially for long term data protection.

The following theorem defines some bounds on $\beta_n$, l, L, and $\Lambda$.

Theorem 1

For the information-theoretically $\beta$-secure key management processes G described herein, each process evaluation value is at most $(1-1/\Lambda)^n$, i.e.)

$$\beta_n = (1 - 1/\Lambda)^n \qquad (3)$$

and the sum of all process evaluation values is at most equal to the ratio of the seed bit set length to the specified key length, i.e.

$$\Sigma_{n=0}^{\infty} \beta_n \leq L/l \qquad (4)$$

where $\beta_0 = 1$.

A number of different information-theoretically $\beta$-secure key management processes can be developed in accordance with the teachings herein. Given two information-theoretically $\beta$-secure key management processes $G_1$ and $G_2$ with (possibly) different $\beta$, it would be desirable to be able to compare the processes and determine whether $G_1$ is better than $G_2$, or vice versa. In order to do so, the evaluation may be considered from the perspective of the adversary (i.e. an unauthorized user/device 120 attempting to access encrypted data). If the adversary simply wants to attack an individual encrypted file or its corresponding key, then it follows from Property 1 that all information-theoretically $\beta$-secure key management processes are the same and provide the same level of difficulty to the adversary. However, the level of difficulty may vary when the adversary attacks more than one encrypted file or key. For example, a first key management process $G_1$ may be considered better than a second key management process $G_2$ if no matter how many encrypted files the adversary wants to attack, the first key management process $G_1$ always presents no lower level of difficulty to the adversary than does second key management process $G_2$ (i.e. from the perspective of the adversary it will always be at least as difficult to attack files encrypted using the first key management process $G_1$ as to attack files encrypted using the second key management process $G_2$). Accordingly, an optimal key management process can be defined according to Definition 3.

Definition 3

An information-theoretically $\beta$-secure key management process G* can be defined as being optimal if for any other information-theoretically $\beta$-secure key management process G with possibly different $\beta$, the entropy of any encryption key generated using the process G* given the corresponding keying material value is equal to or greater than the entropy of the encryption key generated using the process G given the same keying material value. In other words, G* can be defined as being optimal if for any other information-theoretically $\beta$-secure key management process G with possibly different $\beta$ $$H(\{k_{G^*}(X_{i_j})\}_{j=1}^{n} | \{X_{i_j}\}_{j=1}^{n}) \geq H(\{k_G(X_{i_j})\}_{j=1}^{n} | \{X_{i_j}\}_{j=1}^{n}) \qquad (5)$$

for any n and any distinct positive integers $i_1, i_2, \ldots i_n$, where $$k_{G^*}(X_{i_j}) = G^*(K, X_{i_j}) \text{ and } k_G(X_{i_j}) = G(K, X_{i_j}).$$

In section 3 below, example embodiments of optimal key management processes will be described. As shown below, the optimal key management processes can be defined to maximize $\beta_n$, subject to both equations (3) and (4), for as many consecutive integers n as possible, starting with n=1.

Section 3—Construction and Characterization of Example Optimal Key Management Processes As noted above, a keystore seed entropy value f can be defined as a floor of the ratio of the specified number of seed bits to the specified key length. The keystore seed entropy value can be defined to be at least two (i.e. $f=\lfloor L/l \rfloor \geq 2$).

A partition value $f_+$ can be determined based on the ratio of the number of seed bits in the seed bit set to the number of key bits. The partition value can be defined as an integer that is at least equal to the ratio of the number of seed bits in the seed bit set to the number of key bits. For example, the partition value can be defined as a ceiling of the ratio of the specified number of seed bits to the specified key length (i.e. $f_+=\lceil L/l \rceil$).

To generate any encryption key in the plurality of encryption keys, the partition value can be used to partition the seed bit set into a plurality of seed bit partitions. The number of seed bit partitions in the plurality of seed bit partitions can be defined by the partition value. An encryption application 114 can be configured to determine a keying value (i.e. the keying material value or another value derived therefrom) corresponding to a specific encryption key. A key sequence can be determined using the plurality of seed bit partitions and the keying value. The key sequence can include a plurality of key sequence bit sets. Each key sequence bit set can correspond to one of the seed bit partitions. The encryption application 114 can then determine the encryption key from the key sequence.

In some examples, the seed bit set length can be defined to be at least three times the specified key length. To facilitate key generation, the seed bit set length may be defined as an integer multiple of the specified key length.

For example, whenever the partition value is only greater than the keystore seed entropy value by one (i.e. $f_+=f+1$), the seed bit set may be defined by extending an initial set of seed bits specified by the keystore seed. That is, the keystore seed can define an initial set of initial seed bits. The initial set of initial seed bits can have an initial set length that is less than the seed bit set length defined by the key management process. The seed bit set can be defined by appending bits (e.g. appending zeros) to the initial set of initial seed bits such that a combined length of the initial set of initial seed bits and the appended zeros equals the seed bit set length. For example, the seed bit set length can be specified to be integer multiple of the specified key length and the partition value. Zeros can be appended to the end of the initial set of initial seed bits K so that the total length is $f_+l$.

The seed bit set (e.g. a possibly extended K) can then be partitioned into a plurality of seed bit partitions using the partition value $f_+$. For example, the seed bit set can be partitioned into a number of seed bit partitions equal to the partition value $f_+$ with each seed bit partition having a partition length equal to the specified key length l. Accordingly, the number of seed bits in each seed bit partition is equal to the number of key bits. This may simplify generating an encryption key with the specified key length from the plurality of seed bit partitions.

For example, the plurality of seed bit partitions may include $i=0,1,\ldots,f_+-1$ partitions with the ith seed bit partition identified as $a_i$. In particular, each seed bit partition can be defined to include a segment of the seed bit set, e.g. $a_0=(K(0), K(1), \ldots, K(l-1))$ and $a_1=(K(l), K(l+1), \ldots, K(2l-1))$.

For example, a key sequence may be determined from the plurality of seed bit partitions and the keying value using the key management process. The key sequence may be used to generate the encryption key corresponding to the given keying value using the operation(s) defined by the key management process. The generated key may be used to perform various encryption and/or decryption operations, such as encrypting a plaintext file and/or decrypting a ciphertext file.

A finite field can be defined for the key management process. The finite field can be defined to include a number of elements equal to two to the power of the specified key length (e.g. $GF(2^l)$). The finite field can be defined to include a number of elements that is equal to or greater than the number of encryption keys in the plurality of encryption keys.

A key multiplier root $\xi$ can be defined as a root of a binary primitive polynomial of degree l. Every element $\alpha$ of the finite field $GF(2^l)$ can be uniquely represented as a sequence of bits, e.g. $\alpha=\alpha_0+\alpha_1\xi+\ldots+\alpha_{l-1}\xi^{l-1}$.

An individual element $\alpha$ of the finite field can be represented using a binary vector $(\alpha_0, \alpha_1, \ldots, \alpha_{l-1})$. Each element in the finite field $GF(2^l)$ can be represented as an l-dimensional binary vector. The seed bit partitions (e.g. random vectors $a_0, a_1, \ldots, a_{f_+-1}$) defined above can be identified using their respective random elements in $GF(2^l)$.

The key index set can be defined as a subset of the finite field for the key management process (e.g. $\Omega \subseteq GF(2^l)$). Each keying material value in the plurality of keying material values may correspond to one of the elements of the finite field.

An example key management process can define a key mapping from the keystore seed to the plurality of encryption keys by multiplying the seed bit partitions by values determined based on the keying value corresponding to the determined keying material value. For example, a key sequence may be determined by multiplying each seed bit partition by a corresponding exponential of the keying value. The key sequence can include a plurality of key sequence bit sets in which each key sequence bit set corresponds to the multiplication of one of the seed bit partitions with a different exponential of the keying value.

The encryption key may then be determined using the plurality of key sequence bit sets. For example, the encryption key may be determined based on a bit-wise addition of the plurality of key sequence bit sets in the key sequence.

An example key management process G* can define a key mapping between the seed bit set and the plurality of encryption keys as $G^*:\{0,1\}^L \times \Omega \rightarrow \{0,1\}^l$. The key mapping can specify that each encryption key can be generated from the seed bit set and the corresponding keying material value using a linear operation. For example, the key mapping can specify that each encryption key can be generated from the seed bit set using a corresponding keying material value according to:

$$G^*(K,\omega)=a_0+a_1\omega+\ldots+a_{f_+-1}\omega^{f_+-1} \qquad (6)$$

for any key index $\omega \in \Omega$. The additions and multiplications in the key mapping defined by equation (6) can be carried out in the corresponding finite field $GF(2^l)$. In some cases, the key management process can specify that the keying material value corresponding to an encryption key may be used directly as the key index as shown in the example of G* above. Alternately, the key index may be derived from the keying material value.

The result of this example key management process can be illustrated by Theorems 2 and 3.

Theorem 2

The key management process G* that defines a key mapping according to equation (6) is information-theoretically β-secure with $$\beta_n = \begin{cases} (1-1/\Lambda)^n & \text{if } n < f \\ (1-1/\Lambda)^f - \left(f+1-\frac{L}{l}\right)\prod_{i=1}^{f}(1-i/\Lambda) & \text{if } n = f \\ (1-1/\Lambda)^n - q_{n,2} - q_{n,1}(f+1-L/l) & \text{if } n > f \end{cases} \quad (7)$$

where for n>f, $$q_{n,1} = \left(1 - \frac{f}{\Lambda}\right)\frac{\binom{\Lambda}{f}}{\Lambda^n} \sum_{\substack{\{x_i\}_{i=1}^{f}: x_i \geq 1 \\ \sum_{i=1}^{f} x_i = n}} \binom{n}{x_1, x_2, \ldots, x_f}$$

and $$q_{n,2} = \sum_{j=f+1}^{n} \left[\left(1 - \frac{j}{\Lambda}\right)\frac{\binom{\Lambda}{j}}{\Lambda^n} \sum_{\substack{\{x_i\}_{i=1}^{j}: x_i \geq 1 \\ \sum_{i=1}^{j} x_i = n}} \binom{n}{x_1, x_2, \ldots, x_j}\right].$$

The following theorem implies that the example key management process G* defined in (6) is also optimal.

Theorem 3

Let $G:\{0,1\}^L \times \Omega \rightarrow \{0,1\}^l$ be a comparator information-theoretically β-secure key management process with $$\beta_n = \frac{1}{l}H\left(k(X_{n+1}) \mid \{X_j\}_{j=1}^{n+1}, \{k(X_j)\}_{j=1}^{n}\right).$$

Then the following are equivalent:
(1) G is optimal.
(2) For any distinct key index value $\omega_1, \omega_2, \ldots, \omega_{f+1}$ from the key index set $\Omega$, the corresponding keys $k(\omega_i)$, i=1, 2, ..., f, are IID and each uniformly distributed over $\{0,1\}^l$, and further the Shannon entropy of $k(\omega_i)$, i=1, 2, ..., f+1, is equal to the seed bit set length, i.e.

$$H(\{k(\omega_i)\}_{i=1}^{f+1}) = L$$

(3) For n=1, ..., f−1, $$\beta_n = \left(1 - \frac{1}{\Lambda}\right)^n,$$

and $$\beta_f = \left(1 - \frac{1}{\Lambda}\right)^f - \left(f+1-\frac{L}{l}\right)\prod_{i=1}^{f}\left(1 - \frac{i}{\Lambda}\right).$$

Theorem 3 implies that for any optimal key management process G, once distinct key index values for a number of keys corresponding to the partition value $f_+$ are disclosed, one can determine in theory the keystore seed K. However, as a practical matter, a user can deal with and manage only a finite amount of secret information. As such, the systems and methods described herein are configured to provide an optimal way to use the finite amount of secret information for key management subject to the confidentiality of the secret information. If the amount of information disclosed is equal to the original amount of secret information, then no secret is left. Further, since disclosing a key index value ω does not disclose any information about the corresponding key k(ω), the adversary still has to attack the underlying symmetric cipher or its implementation (including its corresponding encryption engine and/or memory) in order to determine the key k(ω). For an optimal key management process G, even if the adversary succeeds in determining a key f−1 times, this does not provide any advantage in attacking other keys. As such, an underlying symmetric cipher equipped with an optimal key management process G may be considered at least f times stronger than the underlying symmetric cipher with a single random key.

Section 4—Variants Against Seed Reconstruction

In the description herein above, an embodiment of an optimal information-theoretically secure key management process G* was described. The example key management process G*makes use of a linear operation to generate an encryption key from the plurality of seed bit partitions as shown by (6). From an information-theoretic perspective, it does not matter whether key generation is linear or nonlinear. However, from a computational perspective, linear key generation may be vulnerable to reconstruction attacks. If an attacker manages to acquire several keys through memory attacks on the actual encryption engine or other means, the attacker may try to "reconstruct" the keystore seed K by solving a system of linear equations with the corresponding key indices as coefficients in $GF(2^l)$.

Examples of key management processes are described herein below that may protect against reconstruction attacks through the use of non-linear operations to generate the encryption keys from the seed bit set. Example key management processes that are implemented as variants of G* are described herein below. The example variants of G* discussed below may be implemented by combining a linear key generation method such as the example linear method defined in (6) with the underlying secure symmetric cypher (or another symmetric encryption cipher) to protect the keystore seed K against reconstruction attacks.

4.1 Example Variant 1

Let E represent an encryption cipher. For example, E may correspond to the underlying secure symmetric cypher, such as the AES algorithm, that is used to encrypt plaintext files using the enycrption keys described herein. Alternately, E may correspond to a different symmetric encryption cipher from that used to encrypt data files.

In general, the encryption cipher E can be configured to, together with a key of length l, take a given plaintext of length l as input to generate a ciphertext of length l. A non-linear key management process $G^*_1$ can be defined that combines the encryption cipher E with the linear key management process G* described herein above. The key management process $G^*_1$ can define a key mapping $G^*_1:\{0,1\}^L \times \Omega \rightarrow \{0,1\}^l$ that specifies that determining the encryption key from the key sequence involves first determining a key sequence output from the plurality of seed bit partitions. For example, the key sequence output may be determined by a bit-wise addition of the plurality of key sequence bit sets in the key sequence.

The key mapping can specify that each encryption key can be generated from the seed bit set and the corresponding keying material value using a non-linear operation. For example, the key mapping may specify that the encryption key may be determined from the key sequence output using the encryption cipher E. For example, the key sequence output can be input to a symmetric encryption cipher. The symmetric encryption cipher can be configured to generate a ciphertext key sequence using the key sequence output. The encryption key may then be defined as the ciphertext key sequence output by the symmetric encryption cipher.

An example of the key mapping $G^*_1:\{0,1\}^L \times \Omega \rightarrow \{0,1\}^l$ can be represented as:

$$G^*_1(K,\omega) = E(a_0 + a_1\omega + \ldots + a_{f_i-1}\omega^{f_i-1}) \quad (8)$$

for any key index value $\omega \in \Omega$.

The key management process $G^*_1$ (e.g. the operation in (8)) is highly nonlinear. The encryption key used in key management process $G^*_1$ can be regarded as an additional shared secret of l bits. Accordingly, the secret shared by the information sending and receiving parties (e.g. authorized devices 105) includes the keystore seed K of seed bit length L and the encryption key that has the specified key length l used by the encryption cipher E in (8). With the additional l bits of secret, it can be shown that the nonlinear key management process $G^*_1$ is at least as strong as the linear key management $G^*$ in the sense of Definition 3.

In addition, the nonlinear key management process $G^*_1$ can be secure against reconstruction attacks. With the nonlinear key management process $G^*_1$, given the key index value $\omega$ and the corresponding key $k(\omega)$, the difficulty of determining the plurality of seed bit partitions $a_0, a_1, \ldots, a_{f_i-1}$ from the keystore seed used to generate the key is equivalent to the difficulty of breaking the underlying secure symmetric cypher.

4.2 Example Variant 2

Another example of a nonlinear key management process $G^*_2$ can be defined that combines the encryption cipher E with the linear key management process $G^*$ described herein above in a different manner. The nonlinear key management process $G^*_2$ may specify that the keying value for a given encryption key is determined by inputting the corresponding keying material value (e.g. the key index) to a symmetric encryption cipher. The symmetric encryption cipher can be configured to generate a ciphertext keying material value using the keying material value. The keying value may then be defined as the ciphertext keying material value.

As an example, the key management process $G^*_2:\{0,1\}^L \times \Omega \rightarrow \{0,1\}^l$ may define the key mapping as $$G^*_2(K,\omega) = a_0 + a_1 E(\omega) + a_2 (E(\omega))^2 + \ldots + a_{f_i-1}(E(\omega))^{f_i-1} \quad (9)$$

for any key index $\omega \in \Omega$.

Again, with the additional l bits of secret, it can be shown that the nonlinear key management process $G^*_2$ is at least as strong as linear key management process $G^*$ in the sense of Definition 3. In addition, nonlinear key management process $G^*_2$ is also secured against reconstruction attacks.

With an underlying secure symmetric cipher of key length l, the present application describes a number of example processes for securely generating, distributing, and maintaining a large number $\Lambda$ of random encryption keys, from an information theoretic perspective, under the practical condition that one can manage only a relatively small number L of shared secret bits K, where $L \ll \Lambda \leq 2^l$. This disclosure define a concept referred to as information-theoretically β-secure key management herein and a framework within which information-theoretically β-secure key management processes can be defined, analyzed, and compared. Optimal processes in terms of their strength against adversary's attacks have been described. The application has further provided examples of specific optimal information-theoretically β-secure process (e.g. $G^*$) including non-linear key management processes configured to provide security against reconstruction attacks.

It will be appreciated that the encryption key management processes for key generation, distribution, and maintenance according to the present application may be implemented in a number of computing devices, including, without limitation, servers, suitably-programmed general purpose computers, audio/video encoding and playback devices, set-top television boxes, television broadcast equipment, and mobile devices. The encryption key management schemes may be implemented by way of software and/or hardware containing instructions for configuring a processor or processors to carry out the functions described herein. The software instructions may be stored on any suitable non-transitory computer readable memory, including CDs, RAM, ROM, Flash memory, etc.

It will be understood that the encryption key management processes described herein and the module, routine, process, thread, or other software component implementing the described methods/processes may be realized using standard computer programming techniques and languages. The present application is not limited to particular processors, computer languages, computer programming conventions, data structures, other such implementation details. Those skilled in the art will recognize that the described methods/processes may be implemented as a part of computer-executable code stored in volatile or non-volatile memory, as part of an application-specific integrated chip (ASIC), etc.

As will be apparent to a person of skill in the art, certain adaptations and modifications of the described methods can be made, and the above discussed embodiments of key management processes should be considered to be illustrative and not restrictive.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. In other instances, well-known methods, procedures and components have not been described in detail so as not to obscure the description of the embodiments. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

I claim:

1. A method for managing a plurality of encryption keys using at least one computing device, each computing device having a processor and a non-transitory device memory, the method comprising:
   a) storing a keystore seed in the non-transitory memory of a particular computing device of the at least one computing device, the keystore seed usable to generate each encryption key in the plurality of encryption keys, wherein the keystore seed defines a seed bit set having a plurality of seed bits and the plurality of seed bits in the seed bit set are independent and identically distributed, and wherein each encryption key is defined by a plurality of key bits, the encryption key has a specified key length, the specified key length is the same for each encryption key, and the specified key length defines a number of key bits in the plurality of key bits, wherein the seed bit set has a seed bit set length, the seed bit set length specifies a number of seed bits in in the seed bit set, and the seed bit set length is at least twice the specified key length;
b) determining, by the processor of the particular computing device, a key management process that defines a key mapping between the seed bit set and the plurality of encryption keys, wherein the key management process is usable by the processor of the particular computing device to generate each encryption key in the plurality of encryption keys from the seed bit set using the key mapping and a keying material value corresponding to that encryption key; and
c) storing key management instructions corresponding to the key management process in the non-transitory device memory of the particular computing device, wherein the key management instructions are executable by the processor of the particular computing device to generate any specific encryption key in the plurality of encryption keys by:
i) partitioning the seed bit set into a plurality of seed bit partitions, wherein the number of seed bit partitions in the plurality of seed bit partitions is defined by a partition value determined based on a ratio of the number of seed bits in the seed bit set to the number of key bits, wherein the partition value is an integer value at least equal to the ratio of the number of seed bits in the seed bit set to the number of key bits;
ii) determining a keying value from the keying material value corresponding to the specific encryption key;
iii) determining a key sequence using the plurality of seed bit partitions and the keying value, wherein the key sequence includes a plurality of key sequence bit sets, and each key sequence bit set corresponds to one of the seed bit partitions; and
iv) determining an encryption key from the key sequence, wherein the encryption key is usable by the processor to perform at least one of encrypting a plaintext file and decrypting a ciphertext file.

2. The method of claim 1, wherein the key sequence is determined by multiplying each seed bit partition by a corresponding exponential of the keying value, and each key sequence bit set corresponds to the multiplication of one of the seed bit partitions with a different exponential of the keying value.

3. The method of claim 1, wherein the encryption key is determined based on a bit-wise addition of the plurality of key sequence bit sets in the key sequence.

4. The method of claim 1, wherein each seed bit partition has a partition length equal to the specified key length such that the number of seed bits in each seed bit partition is equal to the number of key bits.

5. The method of claim 1, wherein the key management process specifies that the keying value is defined as the keying material value.

6. The method of claim 1, wherein the key management process specifies that determining the encryption key from the key sequence comprises:
a) determining a key sequence output from the key sequence, wherein the key sequence output is determined by a bit-wise addition of the plurality of key sequence bit sets in the key sequence; and
b) determining the encryption key by:
i) inputting the key sequence output to a symmetric encryption cipher, wherein the symmetric encryption cipher is configured to generate a ciphertext key sequence using the key sequence output; and
ii) determining the encryption key as the ciphertext key sequence.

7. The method of claim 1, wherein the key management process specifies that the keying value is determined by:
a) inputting the keying material value to a symmetric encryption cipher, wherein the symmetric encryption cipher is configured to generate a ciphertext keying material value using the keying material value; and
b) determining the keying value as the ciphertext keying material value.

8. The method of claim 1, further comprising:
a) identifying a file to be encrypted;
b) generating a file encryption key by
i) randomly selecting a particular keying material value;
ii) determining a particular keying value from the particular keying material value using the key management process;
iii) determining a particular key sequence from the plurality of seed bit partitions and the particular keying value using the key management process; and
iv) determining the file encryption key from the particular key sequence using the key management process; and
c) generating an encrypted file by:
i) applying an encryption cipher to the file to generate a ciphertext file, wherein the encryption cipher uses a cipher key to generate the ciphertext file, and the file encryption key is used as the cipher key for the encryption cipher when the encryption cipher is applied to the file; and
ii) generating the encrypted file from the ciphertext file.

9. The method of claim 8, wherein the encrypted file comprises the ciphertext file and file keying material corresponding to the particular keying material value.

10. The method of claim 1, further comprising:
a) identifying a given encrypted file to be decrypted;
b) determining a given keying material value corresponding to the given encrypted file;
c) determining a given keying value from the given keying material value using the key management process;
d) determining a given key sequence using the plurality of seed bit partitions and the given keying value using the key management process; and
e) generating a file decryption key from the given key sequence using the key management process; and
f) generating a decrypted file by applying a decryption cipher to the given encrypted file to generate a plaintext file, wherein the decryption cipher uses a decryption cipher key to generate the plaintext file, and the file decryption key is used as the decryption cipher key for the decryption cipher when the decryption cipher is applied to the given encrypted file.

11. The method of claim 10, wherein determining the given keying material value corresponding to the given encrypted file comprises extracting the given keying material value from the encrypted file.

12. The method of claim 1, wherein
a) the seed bit set length is at least three times the specified key length, and the seed bit set length is an integer multiple of the specified key length.

13. The method of claim 12, wherein the keystore seed defines an initial set of initial seed bits, wherein the initial set of initial seed bits has an initial set length less than the seed bit set length, and the seed bit set is defined by appending zeros to the initial set of initial seed bits such that a combined length of the initial set of initial seed bits and the appended zeros equals the seed bit set length.

14. A computer program product for managing a plurality of encryption keys, the computer program product comprising a non-transitory computer readable medium having computer executable instructions stored thereon, the instructions for configuring a processor of a computing device to:
   a) store a keystore seed in a non-transitory memory of the computing device, the keystore seed usable to generate each encryption key in the plurality of encryption keys, wherein the keystore seed defines a seed bit set having a plurality of seed bits and the plurality of seed bits in the seed bit set are independent and identically distributed, and wherein each encryption key is defined by a plurality of key bits, the encryption key has a specified key length, the specified key length is the same for each encryption key, and the specified key length defines a number of key bits in the plurality of key bits, wherein the seed bit set has a seed bit set length, the seed bit set length specifies a number of seed bits in in the seed bit set, and the seed bit set length is at least twice the specified key length;
   b) determine a key management process that defines a key mapping between the seed bit set and the plurality of encryption keys, wherein the key management process is usable by the processor to generate each encryption key in the plurality of encryption keys from the seed bit set using the key mapping and a keying material value corresponding to that encryption key; and
   c) store key management instructions corresponding to the key management process in the non-transitory memory, wherein the key management instructions are executable by the processor to generate any specific encryption key in the plurality of encryption keys by:
      i) partitioning the seed bit set into a plurality of seed bit partitions, wherein the number of seed bit partitions in the plurality of seed bit partitions is defined by a partition value determined based on a ratio of the number of seed bits in the seed bit set to the number of key bits, wherein the partition value is an integer that is at least equal to the ratio of the number of seed bits in the seed bit set to the number of key bits;
      ii) determining a keying value from the keying material value corresponding to the specific encryption key;
      iii) determining a key sequence using the plurality of seed bit partitions and the keying value, wherein the key sequence includes a plurality of key sequence bit sets, and each key sequence bit set corresponds to one of the seed bit partitions; and
      iv) determining an encryption key from the key sequence, wherein the encryption key is usable by the processor to perform at least one of encrypting a plaintext file and decrypting a ciphertext file.

15. The computer program product of claim 14, wherein the key management instructions are defined to configure the processor to determine the key sequence by multiplying each seed bit partition by a corresponding exponential of the keying value, wherein each key sequence bit set corresponds to the multiplication of one of the seed bit partitions with a different exponential of the keying value.

16. The computer program product of claim 14, wherein the key management instructions are defined to configure the processor to determine the encryption key based on a bit-wise addition of the plurality of key sequence bit sets in the key sequence.

17. The computer program product of claim 14, wherein the key management instructions are defined to configure the processor to define each seed bit partition with a partition length equal to the specified key length such that the number of seed bits in each seed bit partition is equal to the number of key bits.

18. The computer program product of claim 14, wherein the key management process specifies that the keying value is defined as the keying material value.

19. The computer program product of claim 14, wherein the key management instructions are defined to configure the processor to determine the encryption key from the key sequence by:
   a) determining a key sequence output from the key sequence, wherein the key sequence output is determined by a bit-wise addition of the plurality of key sequence bit sets in the key sequence; and
   b) determining the encryption key by:
      i) inputting the key sequence output to a symmetric encryption cipher, wherein the symmetric encryption cipher is configured to generate a ciphertext key sequence using the key sequence output; and
      ii) determining the encryption key as the ciphertext key sequence.

20. The computer program product of claim 14, wherein the key management instructions are defined to configure the processor to determine the keying value by:
   a) inputting the keying material value to a symmetric encryption cipher, wherein the symmetric encryption cipher is configured to generate a ciphertext keying material value using the keying material value; and
   b) determining the keying value as the ciphertext keying material value.

21. The computer program product of claim 14, further comprising instructions for configuring the processor to identify a file to be encrypted;
   a) wherein the key management instructions are defined to configure the processor to generate a file encryption key by
      i) randomly selecting a particular keying material value;
      ii) determining a particular keying value from the particular keying material value using the key management process;
      iii) determining a particular key sequence from the plurality of seed bit partitions and the particular keying value using the key management process; and
      iv) determining the file encryption key from the particular key sequence using the key management process; and
   b) generating an encrypted file by:
      i) applying an encryption cipher to the file to generate a ciphertext file, wherein the encryption cipher uses a cipher key to generate the ciphertext file, and the file encryption key is used as the cipher key for the encryption cipher when the encryption cipher is applied to the file; and
      ii) generating the encrypted file from the ciphertext file.

22. The computer program product of claim 21, wherein the encrypted file comprises the ciphertext file and file keying material corresponding to the particular keying material value.

23. The computer program product of claim 14, further comprising instructions for configuring the processor to identify a given encrypted file to be decrypted;
   a) wherein the key management instructions are defined to configure the processor to
      i) determine a given keying material value corresponding to the given encrypted file;

ii) determine a given keying value from the given keying material value using the key management process;

iii) determine a given key sequence using the plurality of seed bit partitions and the given keying value using the key management process; and iv) generate a file decryption key from the given key sequence using the key management process; and v) generate a decrypted file by applying a decryption cipher to the given encrypted file to generate a plaintext file, wherein the decryption cipher uses a decryption cipher key to generate the plaintext file, and the file decryption key is used as the decryption cipher key for the decryption cipher when the decryption cipher is applied to the given encrypted file.

24. The computer program product of claim 23, wherein determining the given keying material value corresponding to the given encrypted file comprises extracting the given keying material value from the encrypted file.

25. The computer program product of claim 14, wherein
a) the seed bit set length is at least three times the specified key length, and the seed bit set length is an integer multiple of the specified key length.

26. The computer program product of claim 25, wherein the keystore seed defines an initial set of initial seed bits, wherein the initial set of initial seed bits has an initial set length less than the seed bit set length, and the seed bit set is defined by appending zeros to the initial set of initial seed bits such that a combined length of the initial set of initial seed bits and the appended zeros equals the seed bit set length.

27. A device for managing a plurality of encryption keys, the device comprising:
a) a processor; and
b) a non-volatile device memory having stored thereon instructions for configuring the processor to:
i) store a keystore seed in the non-volatile device memory, the keystore seed usable to generate each encryption key in the plurality of encryption keys, wherein the keystore seed defines a seed bit set having a plurality of seed bits and the plurality of seed bits in the seed bit set are independent and identically distributed, and wherein each encryption key is defined by a plurality of key bits, the encryption key has a specified key length, the specified key length is the same for each encryption key, and the specified key length defines a number of key bits in the plurality of key bits, wherein the seed bit set has a seed bit set length, the seed bit set length specifies a number of seed bits in in the seed bit set, and the seed bit set length is at least twice the specified key length;

ii) determine a key management process that defines a key mapping between the seed bit set and the plurality of encryption keys, wherein the key management process is usable by the processor to generate each encryption key in the plurality of encryption keys from the seed bit set using the key mapping and a keying material value corresponding to that encryption key; and iii) store key management instructions corresponding to the key management process in the non-volatile device memory, wherein the key management instructions are executable by the processor to generate any specific encryption key in the plurality of encryption keys by:

partitioning the seed bit set into a plurality of seed bit partitions, wherein the number of seed bit partitions in the plurality of seed bit partitions is defined by a partition value determined based on a ratio of the number of seed bits in the seed bit set to the number of key bits, wherein the partition value is an integer that is at least equal to the ratio of the number of seed bits in the seed bit set to the number of key bits;

determining a keying value from the keying material value corresponding to the specific encryption key;

determining a key sequence using the plurality of seed bit partitions and the keying value, wherein the key sequence includes a plurality of key sequence bit sets, and each key sequence bit set corresponds to one of the seed bit partitions; and determining an encryption key from the key sequence, wherein the encryption key is usable by the processor to perform at least one of encrypting a plaintext file and decrypting a ciphertext file.

* * * * *

UNITED STATES PATENT AND TRADEMARK OFFICE
CERTIFICATE OF CORRECTION

PATENT NO. : 11,533,167 B2
APPLICATION NO. : 16/880010
DATED : December 20, 2022
INVENTOR(S) : En-hui Yang It is certified that error appears in the above-identified patent and that said Letters Patent is hereby corrected as shown below:

In the Claims

Claim 1, Column 33, Line 2, "length specifies a number of seed bits in in the seed bit" should read -- length specifies a number of seed bits in the seed bit --.

Signed and Sealed this
First Day of August, 2023

Katherine Kelly Vidal
*Director of the United States Patent and Trademark Office*